INVENTOR
GEORGE M. DELALIO

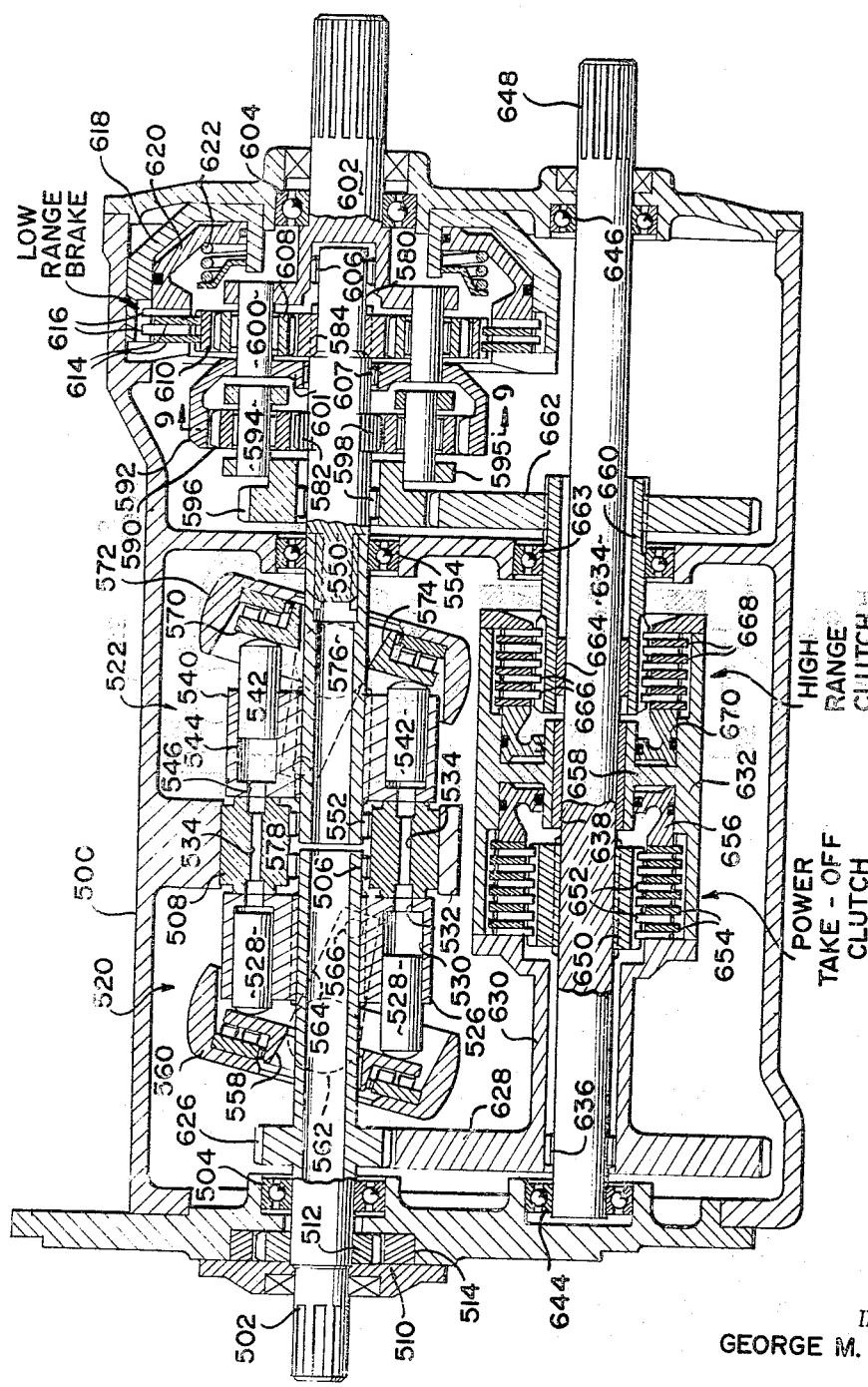

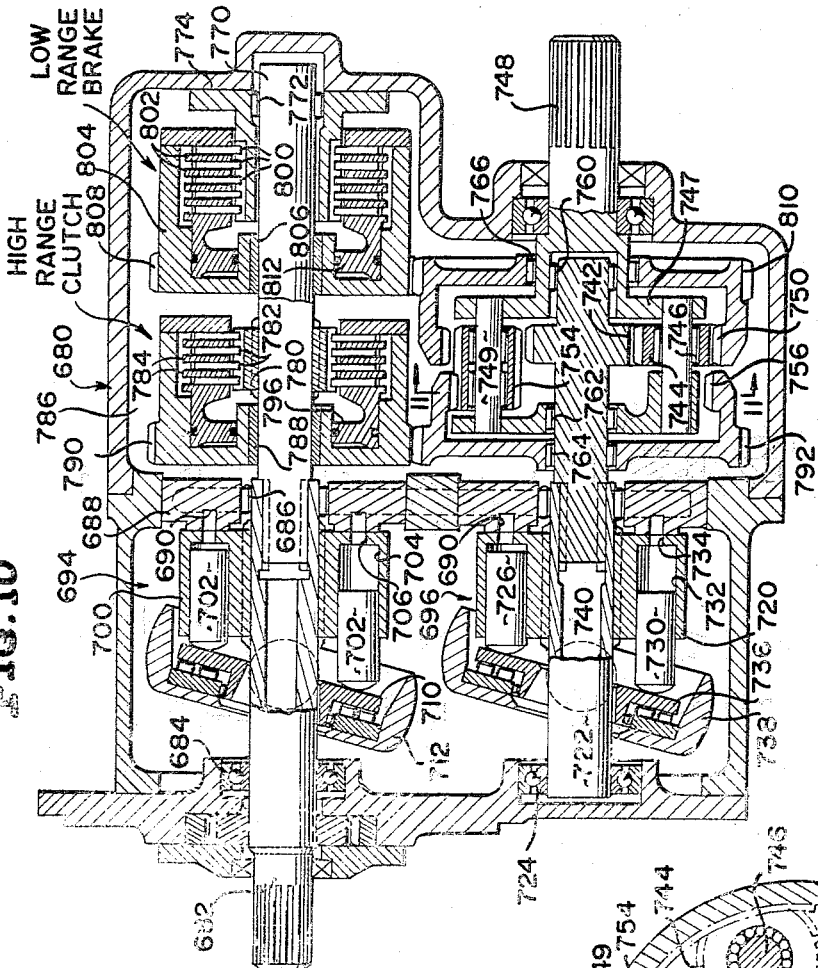
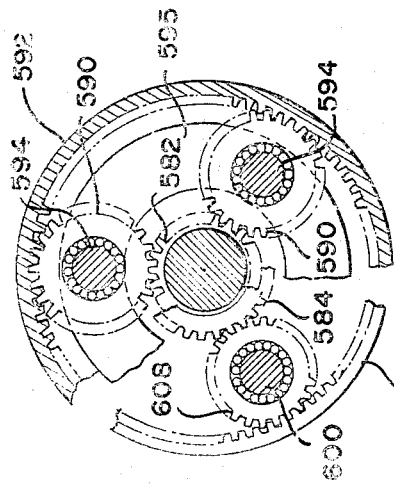
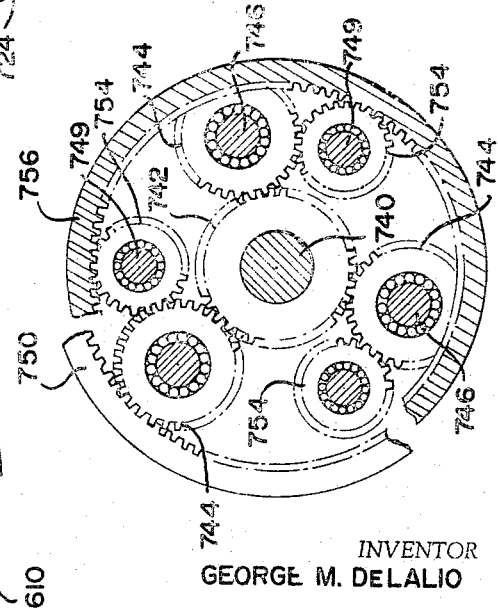
INVENTOR
GEORGE M. DeLALIO

3,306,129
EXTENDED RANGE HYDRAULIC TRANSMISSION
George M. De Lalio, Capel Drive, R.D. 6, Huntington, N.Y. 11743
Filed Apr. 12, 1965, Ser. No. 449,679
24 Claims. (Cl. 74—687)

The present application is a continuation-in-part of copending U.S. patent application Serial No. 342,380, filed February 4, 1964, now abandoned.

The present invention relates to a new and novel extended range hydraulic transmission, and more particularly to a transmission which provides a continuously variable drive ratio between the input and output means over a wide speed range at full power.

Transmissions of the type according to the present invention are particularly adapted for use with wheeled tractors, crawler tractors, earth movers, forklift trucks, and other industrial equipment wherein continuously variable drive in both a forward and a reverse direction is desired.

Industrial tractors and equipment as discussed above require approximately an 8:1 full power ratio range, and in this type of equipment is is also advantageous to provide continuously variable ratio operation from forward to reverse.

In an effort to provide the desired operating characteristics, prior art transmissions have been developed employing hydraulic pump-motor circuits wherein the motor is either directly connected or connected at a fixed ratio to the output means. In order to provide the necessary high output torque and wide speed range, an extremely large motor is required. Accordingly, the pump must be correspondingly large to match the motor and also to transmit full power at high reduction ratios in the pump-motor circuit.

As the size of the pump and motor increases, the power losses of each hydraulic element caused by bearing friction and leakage of hydraulic fluid also increases. Since the pump and motor operate in a series power circuit, increase in the size of the hydraulic elements results in a reduction in the overall efficiency, and furthermore the size and bulk of the transmission increases sharply as compared to an equivalent mechanical-type transmission. In addition, the increase in size of the transmission results in a great increase in the noise level which is of course very undesirable.

Positive displacement pumps and motors of the type referred to above have rubbing sealing surfaces of close tolerance, and as the size of the pumps and motors increases, the rotational speed thereof must be decreased in order to maintain a proper seal and to keep the sliding velocities within practical limits. In many applications, this requires the provision of additional gearing between the prime mover and the pump in order to reduce the speed of the pump, this additional gearing further adding to the bulk and cost of the transmission.

As a result of the disadvantages of such hydraulic pump-motor transmissions as discussed above, this type of prior art hydraulic transmission has found little practical application as a primary power transmission and this type of transmission has been limited to use as a secondary or auxiliary power system for the operation of accessories and the like.

In order to overcome the inherent disadvantages of simple pump-motor hydraulic circuits, prior art transmissions have also been designed that incorporate mechanical gear change mechanisms in combination with a hydraulic circuit. In order to effect variable operation over the desired operating range, attempts have been made to employ refined control systems that work in combination with the hydraulic circuit to shift or change mechanical gear ratios when the various elements of the mechanical gear train are synchronized in speed and momentarily are under no load conditions. The control system usually operates by sensing speed, pressure, power and other system variables. Due to compressibility of the working fluid, variable system leakages, ordinary manufacturing tolerances, and variable operating loads, such control systems are very complicated, unreliable and costly to produce. Therefore, transmissions constructed to necessarily incorporate such control systems have found little practical application in actual practice.

In the application of extended range variable transmissions to industrial equipment, the size and shape of the transmission must be tailored to fit within the space provided in the equipment and in most cases cannot exceed the size of comparable mechanical transmissions.

For example, in a conventional farm tractor, the transmission width and length must be kept to a minimum in order to provide leg room for the operator and to allow the use of various implements in association with the farm tractor which must function in close proximity to the transmission. It is accordingly apparent that the transmission must be compact, short and flexible to the extent that the drive connection axis can be matched to the overall power train construction.

Prior art transmission designs which employ manual or automatic mechanical change mechanisms in combination with the hydraulic transmission have utilized constructions wherein the mechanical elements are added on to a conventional hydraulic pump-motor circuit. This type of arrangement does not provide even reasonable compactness or flexibility which has further limited the utilization of this type of construction.

Another type of prior art hydraulic transmission generally referred to as hydro-mechanical transmissions employ various types of multiple or split power paths. This type of transmission when constructed with mechanical change mechanisms has the advantage of higher efficiency and reasonably small size.

In order to operate properly, such prior art split power path hydro-mechanical transmissions necessarily incorporate a planetary gear train which is driven from the input means. In order to provide reverse operation, transmissions of this type require that the forward driving torque of the planetary gear train to be overcome in addition to supplying reverse driving torque. This imposes very high loads and hydraulic power regeneration on the hydraulic pump and motor circuit which substantially increases the size of the hydraulic elements and reduces the life thereof.

One means of overcoming undesirable regeneration is to provide a mechanical reverse gear mechanism. This arrangement, however, increases the size of the transmission as well as the cost thereof and does not provide a continuously variable operation from forward to reverse.

Since prior art hydro-mechanical designs contain considerable gearing and mechanical change mechanisms in addition to a hydraulic pump-motor circuit, the basic cost is higher than other hydraulic variable type transmissions. This higher cost combined with the disadvantage of not being fully adaptable for providing variable reverse operation has limited the use and acceptance of this type of transmission.

The present invention includes certain modifications for employing a novel combination including output planetary gearing in combination with a hydraulic pump-motor circuit, and wherein a selectively operable clutch and brake means is provided for controlling the connection to the output planetary gearing, the two hydraulic elements of the hydraulic transmission portion being permanently drivingly interconnected with a portion of the input means and a portion of the output planetary gearing respectively so as to provide a novel intercooperation of the various components which results in an extremely compact and efficient arrangement which operates to provide improved performance through two stages of operation.

In the first stage of operation of the present transmission, the hydraulic pump and motor function as a simple circuit with the motor driving the output means through the output planetary gearing reduction ratio. This substantially reduces the required size of the pump and motor units which increases the efficiency and reduces the size and bulk of the transmission as well as the cost thereof.

Also, when the transmission is operating in the first stage of operation, the pump-motor circuit operates as a simple system and a completely continuously variable operation from forward to reverse is provided without regeneration or the use of auxiliary reverse gearing.

In the second stage of operation, the output planetary gearing is connected to the input means and a split power path is provided. This extends the speed or range of the output means to provide higher vehicle speed operation. Within the second stage of operation, with the pump-motor circuit operating in a split power system, the transmission efficiency is further increased, and the hydraulic flow and motor speed is reduced to increase the life of the pump and motor units.

The present invention provides certain modifications which incorporate a selectively operable clutch and brake arrangement which is adapted to shift under power, and accordingly the transmission does not require the provision of any synchronizing means for synchronizing various elements when it is desired to shift the mechanical portions of the transmissions.

Certain modifications of the present invention wherein the clutch and brake arrangement are adapted to shift under power also incorporate a novel control system including compensating means which functions to adjust the pump-motor ratio to change the ratio in a direction opposite to the ratio change effected by the clutch and brake mechanism whereby the pump and motor ratio changes in inverse relationship to the change in mechanical ratio such that a substantially constant over-all ratio is maintained. This provides a smooth transition when shifting ranges and ensures that there will be substantially no change in output speed of the output means and that a substantially constant torque output will also be provided.

As mentioned previously, the over-all arrangement and intercooperation of the various components provides a structure which permits the size of the pump and motor units to be reduced. Additionally, the various elements of the transmission are so arranged so as to produce the most simple and compact arrangement possible. In order to do so, the various components are arranged so that a common valve plate structure is employed for the hydraulic transmission means, this valve plate structure being fixed to the casing, and the drum means of the two elements of the hydraulic transmission are operatively associated with the valve plate structure and are mounted for rotation about fixed axes of rotation. With this arrangement, the various components can be effectively mounted in a minimum amount of space to afford maximum versatility of the transmission.

It is apparent that in shifting from one range to another, various elements of the transmission change speed of rotation and accordingly these differences of speed and inertial loading are opposed to the clutch and brake elements and to the components of the transmission. When shifting occurs, the over-all drive ratio is effected and the control system employed with certain modifications of the invention incorporates a compensation feature to maintain a constant over-all drive ratio.

In order to overcome the problems attendant with shifting the clutch and brake means under power, further modifications of the invention are provided wherein synchronous shifting of the clutch and/or brake elements is obtained when changing ranges, thereby reducing wear and loading on all the components of the transmission. The transmission accordingly does not change instantaneous drive ratio during shifting from one range to another thereby providing smooth continuous operation and eliminating the necessity of providing the aforementioned compensating feature of the control system.

One of these additional modifications also incorporates an auxiliary power take-off shaft without the necessity of adding additional gearing and other separate drive components. This arrangement is of course particularly useful in tractors and the like wherein a power take-off is essential.

An object of the present invention is to provide an extended range hydraulic transmisison wherein the size of the hydraulic pump and motor elements is substantially reduced to thereby increase efficiency and to reduce the noise of the transmission.

Another object of the invention is the provision of an extended range hydraulic transmission wherein the components thereof are arranged to provide the most simple and compact arrangement to thereby provide a transmission of the desired characteristics which may be constructed at a minimum cost.

A further object of the invention is to provide an extended range hydraulic transmission which provides extended range operation and which is continuously variable when operating from forward to reverse and from reverse to forward.

Still another object of the invention is to provide an extended range hydraulic transmission including selectively engageable and disengageable means which can be power shifted thereby eliminating the necessity of providing synchronizing mechanism.

Still another object of the invention is the provision of an extended range hydraulic transmission incorporating a novel control system which permits the drive ratio through two different power paths to be changed while maintaining a substantially constant output speed and torque output.

A still further object of the invention is to provide an extended range hydraulic transmission wherein the selectively engageable and disengageable means of the transmission are operated when the associated drive connection members are substantially in synchronization thereby reducing wear and loading on all of the components.

Another object is the provision of an extended range hydraulic transmission that does not change instantaneous drive ratio during shifting from one range to another, thereby providing smooth continuous operation while eliminating the necessity of providing a compensating feature in the control system.

Yet another object is to provide an extended range transmission that provides an auxiliary power take-off shaft without the necessity of adding additional gearing and other separate drive components.

Other objects and many attendant advantages of the invention will become more apparent when considered in connection with the specifiaction and accompanying drawings wherein:

FIG. 8 is a vertical section through a further modified form of the invention;

FIG. 9 is a sectional view taken substantially along line 9—9 of FIG. 8 looking in the direction of the arrows and broken away for the sake of clarity;

FIG. 10 is a vertical section through still another modified form of the invention;

Figure 12:
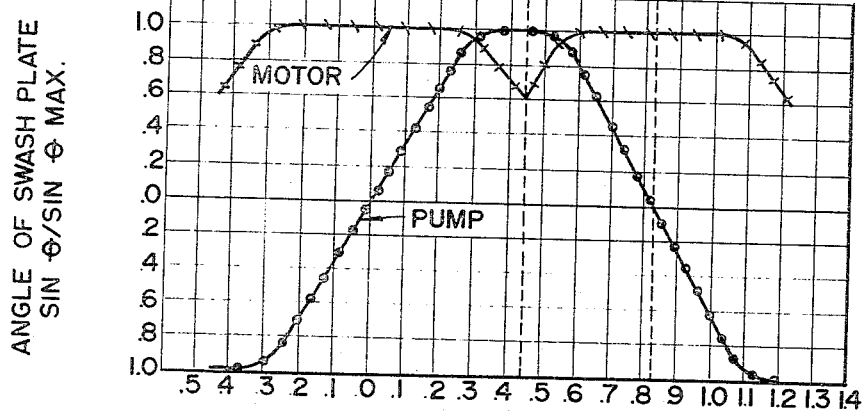
Figure 13:
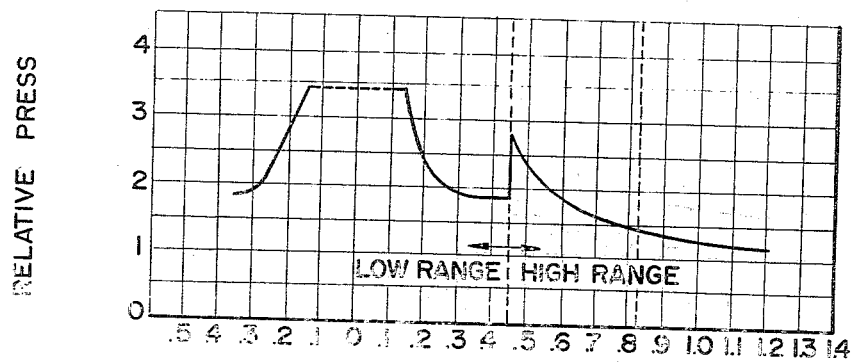
Figure 14:
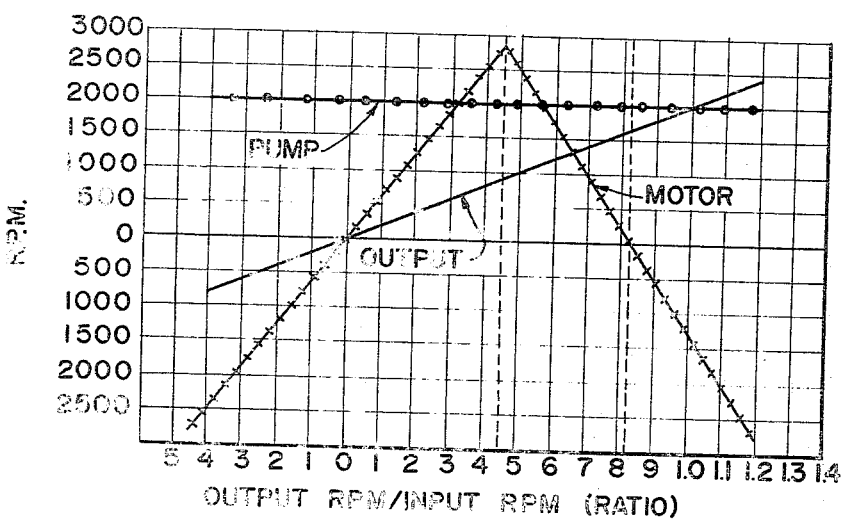

FIG. 11 is a sectional view taken substantially along line 11—11 of FIG. 10 looking in the direction of the arrows and partly broken away for the sake of clarity; and FIGS. 12, 13 and 14 are graphs illustrating certain operating characteristics of the transmissions illustrated in FIGS. 8 through 10 inclusive.

Figure 1:
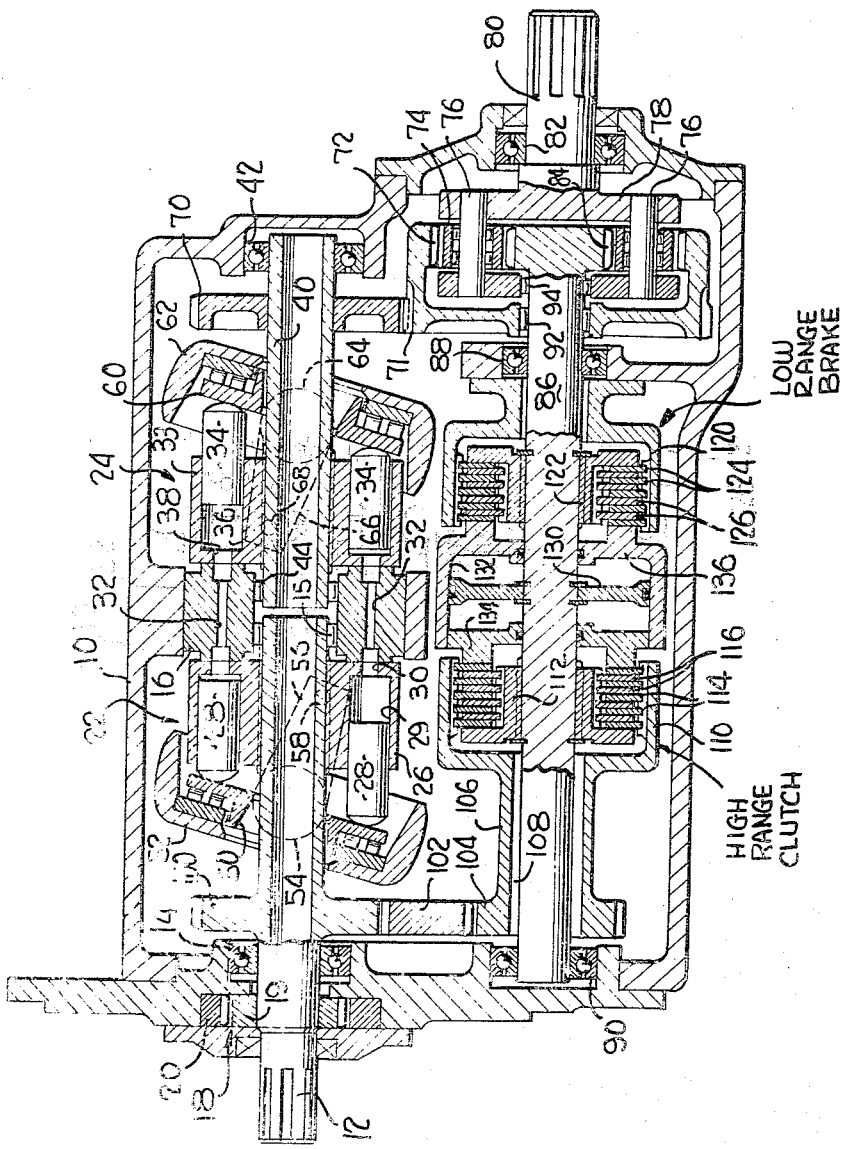
FIG. 1 is a vertical section through a first modification of the extended range hydraulic transmission according to the present invention.

Referring now particularly to FIG. 1 of the drawings, this form of the transmission according to the present invention includes a casing 10, and an input shaft 12 extends through a suitable opening provided in the casing and is rotatably journalled by a first set of ball bearings 14 supported by the casing, the opposite end of the input shaft being rotatably supported by bearing 15 supported in a common valve plate structure 16 which is fixed to the casing 10.

A charge pump is indicated generally by the reference numeral 18 and includes an inner rotor 19 fixed to the input shaft 12 and an outer rotor 20 which rotates in the casing, the two rotors are eccentrically mounted with respect to one another and include teeth which are in intermeshing engagement with one another for pumping liquid through a port in a well known manner. The purpose and mode of operation of this charge pump will be described hereinafter.

The hydraulic transmission of the present invention includes a pair of hydraulic elements identified by reference characters 22 and 24 which may be considered a pump and a motor respectively. Pump 22 includes a drum 26 which is disposed in surrounding relationship to the input shaft 12 and is keyed thereto for rotation therewith. A plurality of pistons 28 are reciprocably mounted within bores 29 provided in drum 26. Suitable ports 30 are provided in communication with the cylindrical bores provided in drum 26, these ports 30 cooperating with timing ports and drilled passages indicated by reference numeral 32 which are provided in the valve plate structure to provide hydraulic flow between the pump and motor units.

The motor unit 24 includes a drum 33 having a plurality of pistons 34 reciprocably mounted within bores 36 provided therein. Ports 38 are in communication with the bores 36 and also provided communication with the ports and passages 32 provided in the valve plate structure. It will be understood that the two drums 26 and 33 form a running seal with the opposite sides of the valve plate structure 16.

The drum 33 is disposed in surrounding relationship to an intermediate shaft 40 and is splined thereto for rotation therewith. Shaft 40 is rotatably supported by a ball bearing means 42 supported by the casing and by a set of bearings 44 mounted within the valve plate structure 16.

The pistons 28 reciprocably mounted within drum 26 are adapted to react on a swash plate thrust bearing 50 which is supported by a bearing housing 52 which in turn is supported by trunnion means 54 which is pivotally supported by the transmission casing. An arm 56 extends away from the trunnion means 54 and includes a laterally extending pin means 58 which is adapted to cooperate with a cam plate hereinafter described for adjusting the position of the swash plate means.

The pistons 34 mounted within drum 33 are adapted to react on a swash plate thrust bearing 60 which is supported by a bearing housing 62 which is secured to trunnion means 64 pivotally supported by the transmission casing. An arm 66 extends from the trunnion means 64 and a laterally extending pin means 68 is secured to the outer end of the arm and is adapted to engage a cam plate hereinafter described for adjusting the position of the swash plate means.

A gear 70 is fixed to the intermediate shaft 40 and meshes with a gear 71 formed on the outer portion of a planetary ring gear 72 which in turn meshes with planet gear 74 rotatably journalled on a plurality of shafts 76 which are supported by a carrier means indicated by reference numeral 78, the right hand portion of the carrier means in turn being formed integral with an output shaft 80 which extends outwardly of the casing and is rotatably supported by ball bearing means 82 supported by the casing.

The planet gears 74 mesh with sun gear means 84 formed at the outer end of a second intermediate shaft 86 which in turn is rotatably supported by a pair of spaced ball bearing means 88 and 90 mounted within the casing. It will be noted that sets of bearings 92 and 94 are disposed in surrounding relationship to the intermediate shaft 86 and serve to respectively journal inner portions of the ring gear means and the carrier means.

A gear 100 is formed integral with the input shaft 12 and meshes with an idler gear 102 which is mounted for rotation about an axis offset with respect to the axis of rotation of the input shaft 12 so that only a section of gear 102 is visible in FIG. 1. The idler gear 102 in turn meshes with a gear portion 104 formed at one end of an auxiliary shaft 106 which is rotatably supported by a bushing 108 disposed about the intermediate shaft 86 such that the auxiliary shaft 106 is freely rotatable with respect to shaft 86.

Auxiliary shaft 106 includes an enlarged cup-shaped portion 110 which cooperates with a member 112 which is keyed and fixed to the intermediate shaft 86. A first plurality of disc members 114 are keyed for rotation with the portion 110, and a second plurality of disc members 116 are disposed intermediate adjacent ones of disc members 114, members 116 being keyed for rotation with member 112. This arrangement provides a conventional multiple disc clutch connection between portions 110 and 112 and which will permit power shifting of the transmission.

A substantially cup-shaped member 120 is fixed to the casing to provide a brake member, this member cooperating with a member 122 which is keyed and fixed to the intermediate shaft 86. A first plurality of disc members 124 are keyed to the outer member 120, and a second plurality of disc members 126 are keyed to member 122 and are disposed intermediate adjacent ones of the discs 124. This arrangement provides a conventional multiple disc brake assembly which also may be power shifted.

A fixed separator disc 130 is secured in fixed relationship to the intermediate shaft 86 and has a sliding fit with a slidable cylindrical portion 132 which in turn includes a first pressure plate portion 134 for engaging the multiple disc clutch, and includes a second pressure plate portion 136 for engaging the multiple disc brake. It is apparent that engagement and disengagement of the multiple disc clutch and brake arrangement may be effected by introducing fluid under pressure to opposite sides of the fixed separator disc 130 which will in turn cause member 132 to be shifted in one direction or the other as the case may be.

Figure 5:
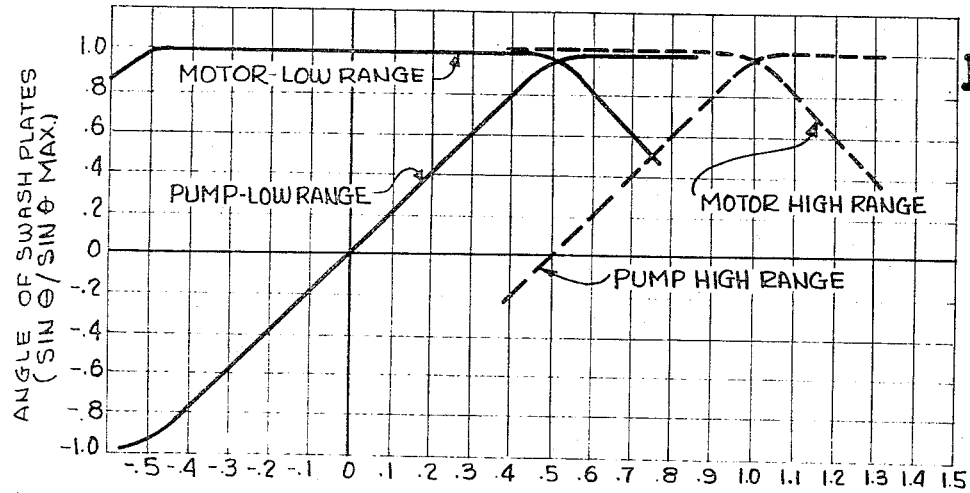
FIGS. 5, 6 and 7 are graphs illustrating certain operating characteristics of the embodiments illustrated in FIGS. 1 through 4 inclusive.
Figure 6:
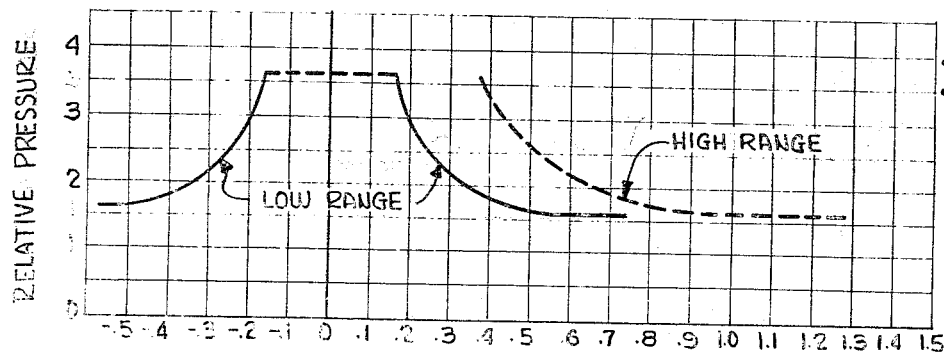
Figure 7:
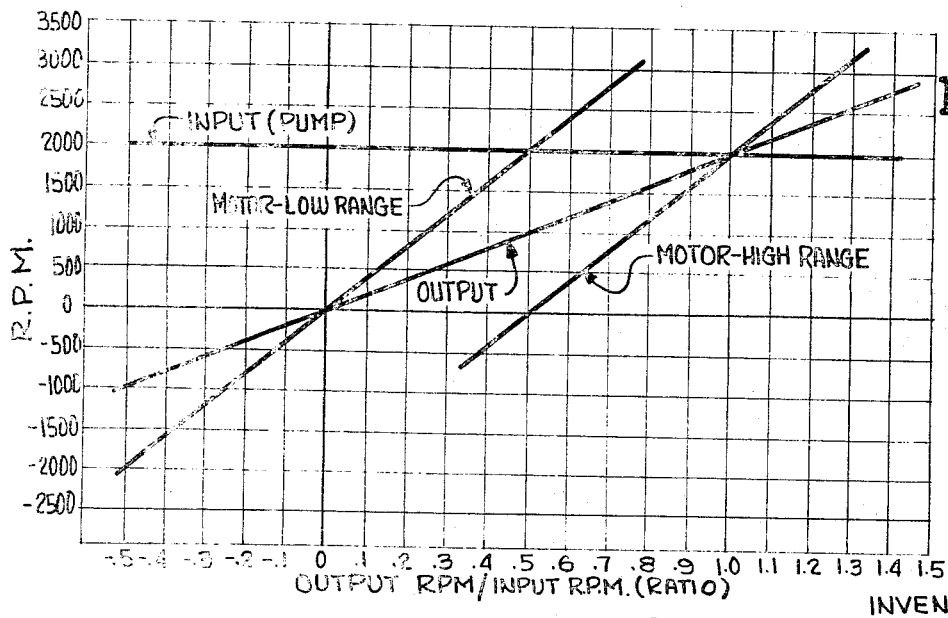

Operation of the transmission illustration in FIG. 1 may be most clearly understood by inspection of FIGS. 5, 6 and 7 which illustrate certain operating characteristics of the transmission. Each of these graphs is presented as a function of output/input speed ratio.

In the low speed or low range stage of operation, the low range brake is applied and the high range clutch is disengaged. The output planetary gearing including the ring gear 72, the planet gears 74 and the sun gear 84 is so constructed that when the sun gear is locked by means of the low range brake, a 2:1 reduction is provided between the drive gear 70 and the output shaft 80.

Consider a first point of operation in which the pump is controlled to one-half displacement and the motor is at full displacement. As the input shaft turns, the pump displaces fluid into the motor. The pump turns two revolutions to drive the motor one revolution to effect a 2:1 reduction in the pump-motor circuit. The motor drives the output through the output planetary gear train at an additional 2:1 reduction, thereby, providing an over-all transmission reduction of 4:1 which corresponds to output/input ratio of .25.

Referring to FIG. 5, at a ratio of .25 the motor is at full displacement and the pump is at .5 displacement. Further, referring to FIG. 7, it is noted that the input shaft is rotating at 2,000 r.p.m. and the output shaft is rotating at 500 r.p.m.

As the pump displacement is further increased, it is apparent that the motor and output shaft speed will increase proportionately. When the pump reaches full displacement, the motor displacement is decreased and the pump then drives the motor faster than the input shaft, as indicated in FIG. 7.

As the pump displacement is again decreased, the motor is driven at a lower speed until at 0 pump displacement the motor is hydraulically locked from rotating. When the pump displacement is then increased in an over-center or negative direction, the hydraulic flow to the motor is reversed and the motor drives the output shaft in the opposite or reverse direction.

In the low range of operation, as shown on FIG. 6, at full power the pressure will vary as a function of the pump displacement. For an operating range of 4.5:1, it is noted that the pressure variation is approximately 2½:1 which is considered desirable in order to maintain light construction of hydraulic pump and motor, and at the same time provide good operating efficiency of the hydraulic circuit.

To provide high speed or high range operation, the low range brake is released and at the same instant the high range clutch is engaged. This is effected by draining the pressure on the right side of the separator disc 130 and applying pressure to the left side of the disc. The reversing of pressure moves the pressure portion 134 to the left disengaging the low range brake friction discs while simultaneously engaging the high range clutch friction discs.

A suitable control system that actuates the high clutch and low brake and also regulates the pump and motor displacement to provide variable operation is described hereinafter.

In high range operation, a driving connection is made between the input shaft and the output planetary gear train by means of the high range clutch. This provides a simple split power system where the hydraulic pump and motor transmits only a portion of the power to the output planetary.

Intermediate drive gears 100, 102 and 104 form a mechanical power path to the output planetary gear train. These gears are dimensioned to provide a 2:1 reduction from the input shaft 12 to the output shaft 80 when the ring gear is stationary.

In this stage, at a first operating point, the pump is at 0 displacement and the motor is at full displacement. The motor is, therefore, hydraulically locked, locking the planetary ring gear. The intermediate gears 100, 102 and 104 drive the planet gear 74 which react against the stationary ring gear to drive the output shaft 80 at a 2:1 reduction which corresponds to an output/input ratio of .5.

Referring to the curves at a ratio of .5 in high range, FIG. 5 shows the pump at 0 displacement and the motor at full displacement. Referring further to FIG. 7, the motor speed is 0 r.p.m.

At this point of operation, it is noted there is no hydraulic flow and, therefore, all the power is transmitted to the output shaft by the mechanical drive path.

As the pump angle is positioned over-center or in a negative direction, the pump drives the motor in reverse. The motor drives the planetary ring gear 72 in the reverse output direction and decreases the output speed.

When the pump angle is positioned toward positive displacement, the motor drives the ring gear in the same output direction which increases the output speed.

The operating characteristics of the transmission in high range is similar to that in low range except that the entire range of the transmission is shifted up or extended by introducing a mechanical power path. It is also noted that considerable overlap is provided in each range of operation so that it is not necessary to continually change range of operation to obtain desired operation.

It will be noted in connection with the construction shown in FIG. 1 that the input shaft 12 and the intermediate shaft 40 are coaxial with one another and each are journalled within the common valve plate structure 16. The two drums 26 and 33 of the hydraulic elements are accordingly mounted for rotation about fixed axes, the drums being disposed at opposite sides of the common valve plate structure. The intermediate shaft 86 is disposed in substantially parallel spaced relationship to the shafts 12 and 40, and the clutch and brake means is mounted in surrounding relationship to shaft 86. With this arrangement, a very compact construction is provided which permits the various components to be assembled in a minimum amount of space and the arrangement requires fewer components than are required in corresponding prior art transmissions.

Figure 2:
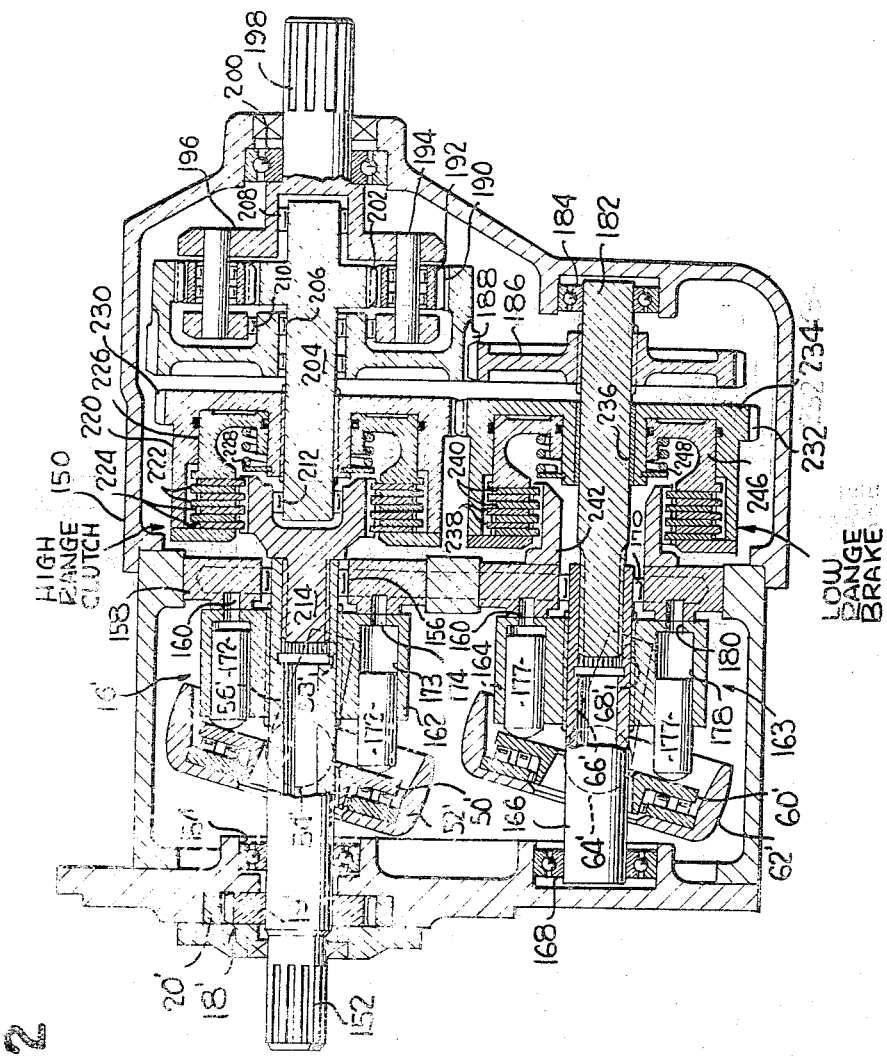
FIG. 2 is a vertical section through a second modification of the transmission according to the present invention.

Referring now to FIG. 2 of the drawings, a modification is illustrated wherein the input and output shafts are coaxial with one another in contrast to the arrangement of FIG. 1 wherein the input and output shafts are offset with respect to one another. Furthermore, whereas the hydraulic elements in FIG. 1 are disposed at opposite sides of a common valve plate structure, the modification illustrated in FIG. 2 employs an arrangement wherein the hydraulic elements are each disposed on the same side of the common valve plate structure.

Referring now particularly to FIG. 2 of the drawings, a casing 150 is provided, an input shaft 152 extending into the casing through a suitable opening and being rotatably supported by a ball bearing 154 mounted within the casing and a set of bearing 156 disposed within a common valve plate structure 158. This valve plate structure is provided with suitable timing ports and passages as indicated by reference numerals 160 for providing proper hydraulic communication between a pair of hydraulic elements.

The hydraulic portion of this transmission includes a pump indicated generally by reference numeral 161 and a motor indicated generally by reference numeral 163, the pump including a drum 162 and the motor including a drum 164. Drum 162 is disposed in surrounding relationship to and is keyed to the input shaft 152 and has a running seal with the left hand side of the common valve plate structure 158.

Drum 164 of the motor is disposed in surrounding relationship to and is keyed to an intermediate shaft portion 166 which is rotatably supported by ball bearing means 168 supported within the casing and a set of bearings 170 mounted within the common valve plate structure 158. Drum 164 also has a running seal with the left hand side of the common valve plate structure as seen in FIG. 2.

A plurality of pistons 172 are reciprocably mounted within bores 173 provided in drum 162, ports 174 providing communication between the bores 173 and the ports and passages provided in the common valve plate structure. Swash plate means is provided for controlling the reciprocation of pistons 172, components 50', 52', 54', 56' and 58' corresponding to the similarly numbered components described in connection with FIG. 1 for controlling the movement of the pistons of the pump means.

A plurality of pistons 177 are reciprocably mounted within bores 178 provided in drum 164, ports 180 providing communication between bores 178 and the ports and passages provided in the common valve plate structure. Swash plate means is provided for controlling the reciprocation of pistons 177, and components numbered 60', 62', 64', 66' and 68' corresponding to the similarly numbered components described in connection with FIG. 1 for controlling the movement of the pistons of the motor of the transmission.

An intermediate shaft 182 has one end thereof splined within a hollow end of the intermediate shaft 166, the opposite end of intermediate shaft 182 being rotatably supported by ball bearing means 184 mounted within the casing. A gear 186 is secured to intermediate shaft 182 for rotation therewith and meshes with a gear 188 formed on the outer surface of a planetary ring gear 190. Ring gear 190 is in meshing engagement with planet gears 192 each of which is mounted upon a shaft 194 which in turn is supported by carrier means 196 one portion of which is formed integral with the output shaft 198 which is journalled in ball bearing means 200 mounted within the casing.

A sun gear 202 is formed on an intermediate shaft 204, the sun gear being in meshing engagement with the planet gears 192. Intermediate shaft 204 is supported for rotation by a first plurality of bearings 206 disposed within a central bore provided in the ring gear means 190. A set of bearings 208 rotatably supports the outer end of intermediate shaft 204, bearings 208 being mounted within a suitable recess provided in the carrier means 196. It will also be noted that a set of bearings 210 is disposed in surrounding relationship to a portion of the ring gear means for supporting the inner end of the carrier means. Intermediate shaft 204 is also rotatably supported by a set of bearings 212 disposed within an inner portion of the auxiliary shaft portion 214 which is splined to the input shaft 152.

An intermediate member 220 is splined and fixed to the intermediate shaft 204 and is adapted to rotate therewith. A first plurality of clutch discs 222 are fixed for rotation with member 220, while a second plurality of clutch discs 224 are fixed for rotation with the outer end of auxiliary shaft 214, the discs 224 being disposed between alternate ones of discs 222.

A power piston 226 is supported within the hollow interior of member 220 and is sealed with respect thereto for receiving fluid pressure for actuating the piston. A compression spring 228 normally urges piston 226 to the right to release the clutch, whereas fluid pressure is adapted to overcome the force of the spring 228 thereby urging piston 226 to the left to cause engagement of the multiple disc clutch means which of course can be shifted under power.

Intermediate member 220 has a gear 230 formed on the outer diameter thereof which meshes with a gear 232 formed on the outer diameter of an intermediate member 234 which in turn is rotatably supported by a bushing 236 disposed in surrounding relationship to the intermediate shaft portion 182. A plurality of brake disc members 238 are fixed for rotation with the inner portion of intermediate member 234, and a plurality of brake discs 240 are fixed to a member 242 which is in turn fixed to the valve plate structure 158 which is secured in the position shown within the casing. The brake discs 240 are disposed between intermediate ones of the brake discs 238, and a power piston 246 is slidably positioned within the central recess portion of intermediate member 234, this power piston being adapted to move to the left as seen in FIG. 2 when fluid pressure is introduced to the right side of the piston for engaging the brake means. A compression spring 248 normally urges piston 246 to the right to release the brake.

The modification illustrated in FIG. 2 operates in a manner similar to that as shown in FIG. 1. In low range, the low range brake is engaged and the high range clutch is disengaged. This locks the planetary sun gear 202. The pump drives the motor and the motor in turn drives the intermediate shaft 182 and gear 186. Gear 186 drives the planetary ring gear 190 which drives the planet gears 192. Planet gears 192 react against the locked sun gear 202 to drive the output shaft at approximately a 2:1 reduction with respect to the motor.

The operating characteristics of this modification are similar to those of FIG. 1 as shown on FIGS. 5, 6 and 7.

As the pump displacement is increased and decreased, the output shaft speed is changed proportionately. When the pump is displaced over-center or in the negative direction, the rotation of the motor is reversed and the output shaft rotation is also reversed.

To provide high range operation, the low range brake is released and at the same instant the high range clutch is engaged. This establishes a driving connection from the input shaft 152 to the planetary sun gear 202.

In high range, when the pump is at 0 displacement, the motor and ring gear are locked. The sun gear drives the planet gears 192 which react against the locked ring gear to drive the output shaft 198. At this point of operation, there is no hydraulic flow and, therefore, all power is transmitted to the output shaft by mechanical elements. As the pump displacement is increased negatively, the motor drives the ring gear in a reverse direction which decreases the output speed. When the pump displacement is increased in a positive direction, the motor drives the ring gear in the same direction as the output rotation and, therefore, the output speed is increased.

Therefore, it is apparent that this modification similarly provides continuously variable operation forward and reverse and also provides variable extended range operation.

This modification is particularly adaptable to applications requiring a minimum length and where it is preferred to have the input and output shafts on the same axis.

It will be noted in connection with the modification illustrated in FIG. 2 that this modification also includes a charge pump 18' including rotors 19' and 20', these various components being similar to the similarly numbered components illustrated in FIG. 1. It will also be noted that the arrangement shown in FIG. 2 employs a common valve plate structure and a plurality of parallel spaced intermediate shafts such that the various components can be arranged in a most compact manner while employing a minimum number of components to achieve the desired end results.

Figure 3:
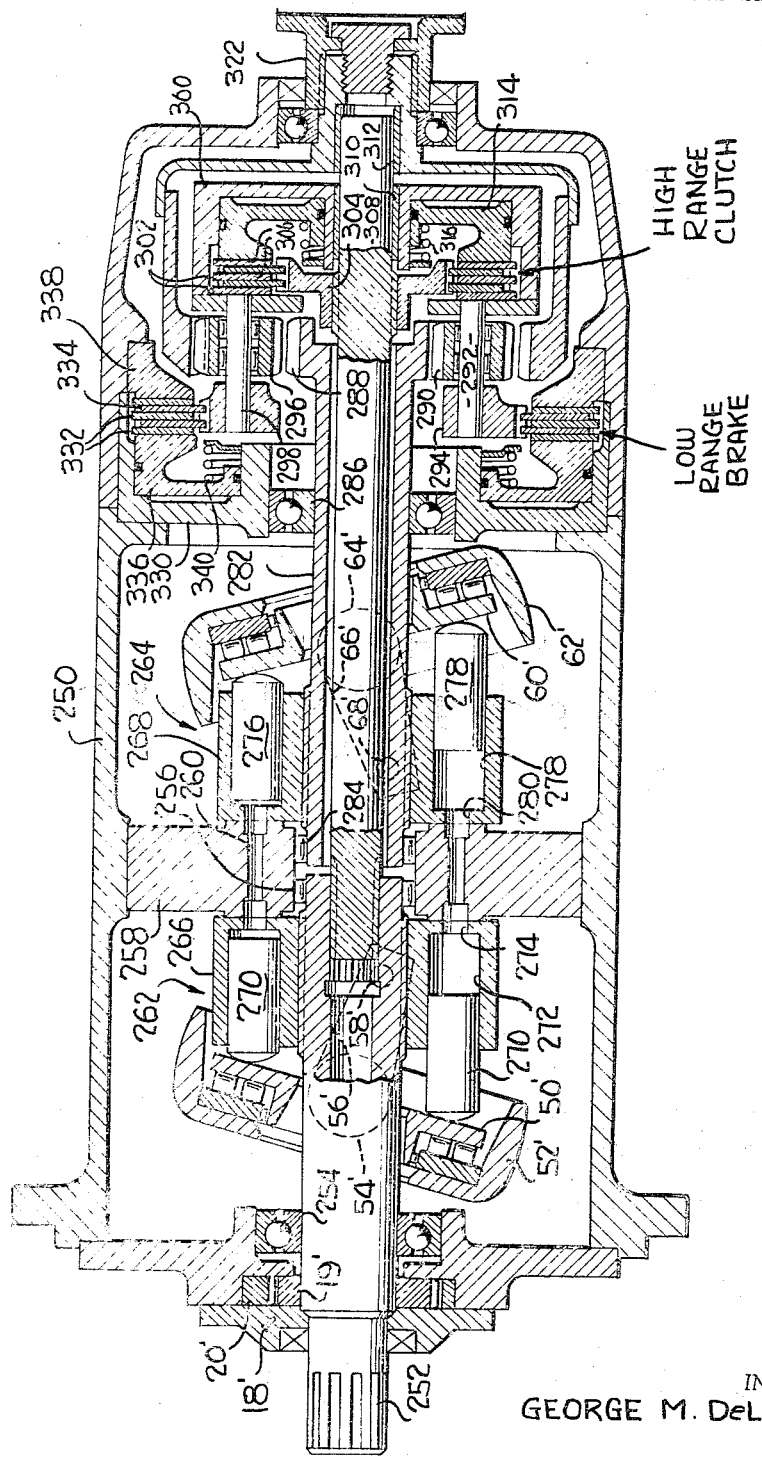
FIG. 3 is a vertical section through still another modified form of the transmission.

Referring now to FIG. 3 of the drawings, a further modified form of the invention is illustrated and includes a casing 250 having an input shaft 252 extending thereinto through a suitable opening provided therein. Input shaft 252 is rotatably supported by a ball bearing 254 supported within the casing and a set of bearings 256 supports the inner end of the input shaft, bearings 256 being mounted within a common valve plate structure 258 which is fixed to the casing. This valve plate structure is provided with suitable timing ports and connecting passages indicated generally by reference numeral 260 for providing hydraulic intercommunication between the hydraulic elements in the well known manner.

A hydraulic pump is indicated generally by reference numeral 262 and a hydraulic motor is indicated generally by reference numeral 264. The pump and motor respectively include drums 266 and 268 which have a running seal with opposite faces of the common valve plate structure 258.

A plurality of pistons 270 are reciprocably mounted within bores 272 provided in drum 266. Ports 274 provide communication between the bores 272 and the ports and passages provided in the common valve plate structure. Swash plate means is provided for controlling the reciprocation of pistons 270, this swash plate means including components 50′, 52′, 54′, 56′ and 58′ which are identical in construction with the correspondingly numbered parts discussed in connection with FIG. 1.

A plurality of pistons 276 are reciprocably mounted within bores 278 provided in drum 268. Swash plate means is provided for controlling the reciprocation of pistons 276 and the swash plate means includes components 60′, 62′, 64′, 66′ and 68′ which are identical in construction with the correspondingly numbered components described in connection with FIG. 1 of the drawings.

Drum 266 is disposed in surrounding relation to and is keyed to shaft 252 for rotation therewith. Drum 268 is disposed in surrounding relationship and is keyed to intermediate hollow shaft 282 which is rotatably supported at one end by a set of bearings 284 mounted within the valve plate structure 258, the shaft 282 being also rotatably supported within a ball bearing 286 mounted within the casing. Intermediate shaft 282 is provided with a sun gear means 288 provided at the rear end thereof.

Sun gear 288 meshes with planet gears 290 which are rotatably journalled on shafts 292 supported by carrier means 294. Planet gears 290 are in turn in mesh with planet idler gears 296 which are mounted on shafts 298 also supported by the carrier means 294.

The carrier means 294 is rigidily connected to a cup-shaped portion 300 which is journalled on auxiliary shaft 308 by means of bushing 310, portion 300 having a plurality of clutch discs 302 fixed thereto for rotation therewith, an inner member 304 having a plurality of clutch discs 306 fixed thereto for rotation therewith and being interposed between adjacent ones of the clutch discs 302 to provide a multiple disc type clutch arrangement. Member 304 is splined to the outer surface of an auxiliary shaft 308 which extends through intermediate shaft 282 in spaced relationship thereto and which is splined at its forward end to the inner splined portion of the input shaft 252. The rear end of auxiliary shaft 308 is rotatably supported by bushing 312. A pressure piston 314 is provided for actuating the multiple disc clutch, a compression spring 316 normally urging the piston toward the right as seen in FIG. 3 to release the clutch. It is apparent that when fluid pressure is introduced to the right side of the piston as seen in FIG. 3, the piston will be urged to the left to engage the multiple disc clutch.

The planet idler gears 296 are in meshing engagement with a ring gear 320 which extends to the right as seen in FIG. 3 and is drivingly connected with an output shaft means 322.

A member 330 is fixed to the casing 250, and a plurality of brake discs 332 are fixed to member 330 for free longitudinal movement with respect thereto but being prevented from rotation with respect thereto. A plurality of brake discs 334 are fixed for rotation with the outer surface of the carrier means 294, brake discs 334 being interposed between adjacent ones of brake discs 332 so as to provide a multiple disc brake arrangement. A power piston 336 is slidably positioned within member 330 and is adapted to clamp the multiple disc brake members against a fixed abutment member 338. A compression spring 340 normally urges the power piston 336 to the left as seen in FIG. 3 to release the brake, but the power piston may be moved to the right when fluid under pressure is introduced to the left side of the power piston to thereby engage the brake and hold the carrier means 294 against rotation.

The operation of the modification illustrated in FIG. 3 is similar to that of the modification shown in FIG. 1. In low range, the low range brake is applied and the high range brake is disengaged. The pump drives the motor. The motor drives the planetary sun gear 288 which drives the planet and planet idler gears 290 and 296 respectively. The planet and planet idler gears react against the locked carrier member 294 to drive the ring gear 320 and output shaft means 322 at approximately a 2:1 reduction to increase the output torque. As the pump and motor displacement is varied, the output speed and direction is changed proportionately.

In high range, the low range brake is released and the high range clutch is engaged. The planet carrier 294 is driven at input speed which shifts or extends the range of the transmission.

When the pump is at 0 displacement, all power is transmitted to the planetary gear train by the central shaft which drives the output flange at approximately an output/input ratio of .5. As the pump displacement is increased, the output speed is increased and when the pump is displaced negative, the output is decreased.

The operating characteristics for this modification are the same as that shown in FIG. 1 and are shown on FIGS. 5, 6 and 7. This modification is particularly adaptable to applications where it is preferred to have the input and output connect coaxially and where minimum transmission diameter is required.

It should be understood that the gear ratios and operating ranges of all modifications were selected to best illustrate operation and that the over-all construction and operations of each modification is not limited to any particular form.

It will be noted in connection with the modification shown in FIG. 3 that this modification also includes the charge pump 18′ having rotors 19′ and 20′ similar to those discussed in connection with FIG. 1. In the modification shown in FIG. 3, the input shaft as well as each of the intermediate shafts are coaxial with one another as is the output shaft. The drums of the two hydraulic elements are disposed so as to have the running seal with opposite faces of the common valve plate structure 258, each of these drums being mounted for rotation about fixed axes of rotation as are all of the modifications of the invention, the drums in the instant modification also being mounted for rotation about axes of rotation which coincide with one another. It is also apparent that by disposing the various components in surrounding relationship to the different shafts and by extending the shafts longitudinally of one another the minimum transmission diameter is obtained.

Figure 4:
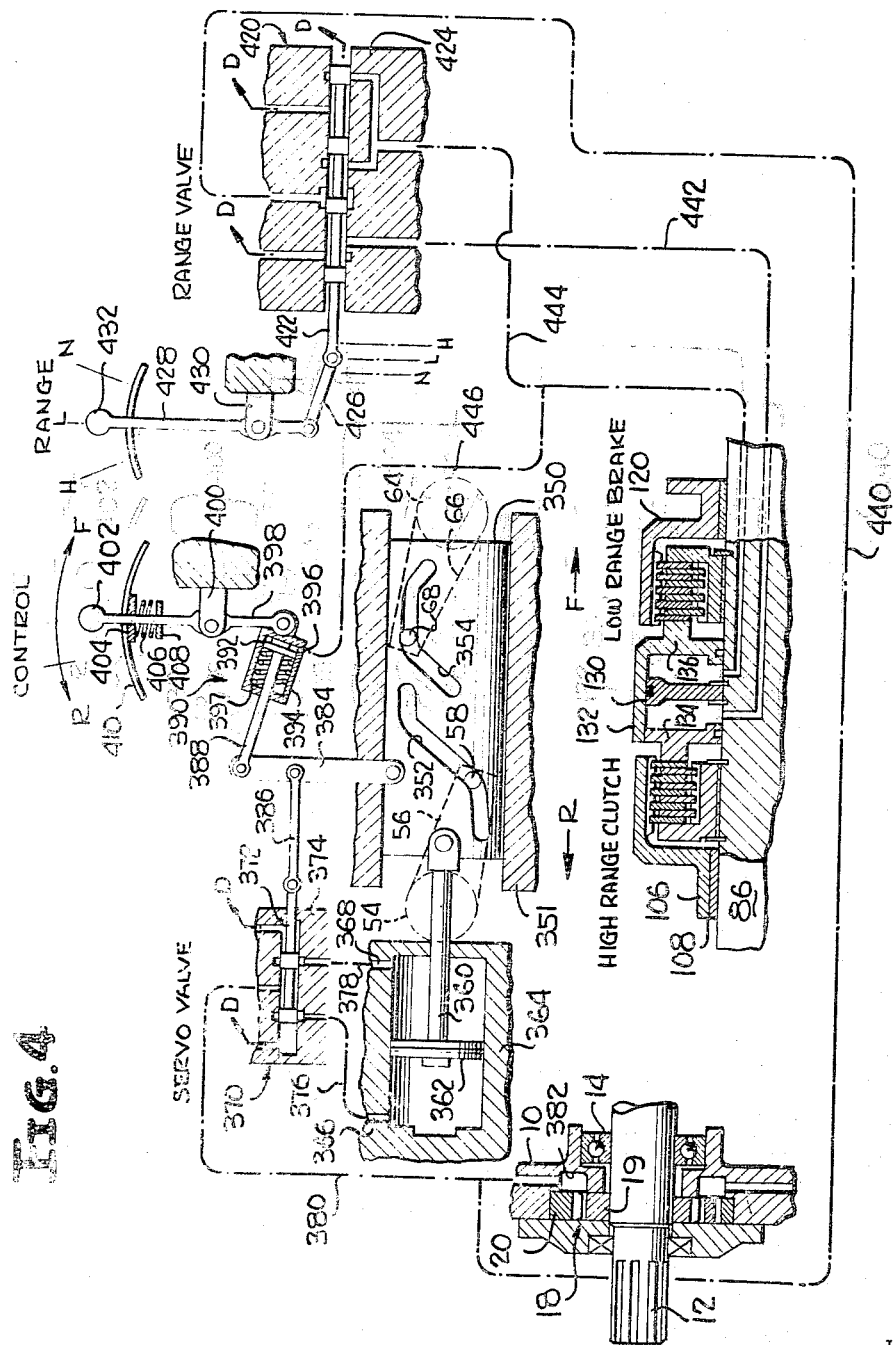
FIG. 4 is a somewhat schematic view of a control system adapted to operate each of the transmissions illustrated in FIGS. 1 through 3 inclusive.

Turning now to FIGURE 4 of the drawings, a control system for operating the transmission means of the present invention is illustrated. This control system is particularly described in connection with the structure incorporated in FIG. 1 of the drawings, but it will be understood that this same control system can be equally as well applied to the corresponding elements of the transmission shown in FIGS. 2 and 3 of the drawings. In other words, the control system may be interconnected with the swash plate means and the clutch and brake means of the transmission means in each modification and serves to control the operation of the different modifications in a similar manner.

As seen in FIG. 4, a cam plate 350 is reciprocably supported within a suitable guide and supporting means 351, the cam plate means being provided with a pair of cam slots 352 and 354 which respectively receive the pins 58 and 68 as described in connection with FIG. 1 whereby movement of the cam plate within its guide and support portion serves to control the angle of the swash plate means associated with the pump and motor of the transmission.

Cam plate 350 is connected with a piston rod 360 having a piston 362 at the opposite end thereof which is slidably disposed within a cylinder 364. A pair of ports 366 and 368 are in communication with opposite ends of the cylinder within which the piston reciprocates for actuating the cam plate.

A servo valve is indicated generally by reference numeral 370 and includes a spool member 372 which is reciprocably mounted within a bore provided in the valve housing 374. A first fluid line 376 connects the bore in the valve housing with the portion 366 while a second fluid line 378 connects the bore in the valve housing with the port 368.

A fluid line 380 connects the discharge portion 382 of the charge pump 18 with a central port in the valve housing for supplying fluid pressure to the central part of the bore in the valve housing 374. The ports indicated by reference character D are connected with a drain or return to a suitable sump.

A link 384 has the lower end thereof pivotally interconnected with the upper portion of cam plate 350. A rod 386 has the opposite ends thereof pivotally interconnected with link 384 and the spool member 372. The upper end of link 384 is pivotally interconnected with the outer end of a piston rod 388 which comprises a portion of a compensator means indicated generally by reference numeral 390.

The opposite end of piston rod 388 has a piston 392 secured thereto which is slidably disposed within a cylinder 394 having a port 396 disposed at one end thereof. A compression spring 397 is disposed within cylinder 394 and normally urges piston 392 toward the right end of the cylinder as seen in FIG. 4 of the drawings.

The cylinder 394 is pivotally interconnected with the lower end of a control lever 398 which is pivotally supported at an intermediate portion by a suitable support bracket 400. The upper end of lever 398 is provided with a knob 402 which can be manually grasped for moving the control lever in either direction so as to position the pump-motor circuit either toward the reverse direction as indicated by the letter R or toward the forward direction as indicated by the letter F.

A spring loaded friction plate 404 is provided in surrounding relationship to lever 398 and is urged upwardly by a compression spring 406 which engages a fixed plate 408 secured to the lever. The upper surface of the friction plate engages the undersurface of a fixed arcuate member 410. It is apparent that the friction plate will normally hold the lever 398 in any desired operative position after it has been manually adjusted.

A range valve is indicated generally by reference numeral 420 and includes a four-step spool member 422 which is slidably disposed within a bore provided in the valve housing 424. The spool member 422 is pivotally connected with a connecting link 426 which in turn is pivotally interconnected with the lower end of a control lever 428 which is pivoted at an intermediate point thereof to a suitable support bracket 430. The upper end of lever 428 is provided with an enlarged knob 432 whereby it may be manually grasped for movement to the high position as indicated by the letter H to the low position as indicated by the letter L or the neutral position as indicated by the letter N.

Fluid line 440 provides fluid pressure from the output of the charge pump 18 to a central port in the valve housing 424 which provides fluid communication with the central portion of the bore within the valve housing. Two ports disposed in the upper portion of the valve housing at either side of the input port discharge to a drain or suitable sump and are so indicated by the letter D.

A fluid line 442 provides fluid communication between the range valve and the left side of the separator disc 130 provided between the clutch and brake mechanisms. A fluid line 444 provides fluid communication between the range valve and the right side of the separator disc 130. A branch fluid line 446 is connected with fluid line 444 and provides communication between fluid line 444 and the inlet port 396 of the compensator means 390.

To provide low range operation, the range lever is positioned to the L position as shown. This allows pressure in line 440 to enter line 444 and flow into the right side of the separator disc 136, which forces portion 136 to the right to engage the low range brake.

In low range, line 446 ports pressure to the right side of the compensator actuator piston. This pressure overcomes the spring force and firmly holds the piston against the compressed spring 397. As control lever 398 is moved forward, the top portion of the link 384 moves to the left which momentarily moves the servo valve spool 386 to the left. This allows pressure from line 380 to enter line 376 while simultaneously draining the pressure in line 378. Fluid enters the left side of the piston and forces the cam plate 350 to the right. As the cam moves, the link 384 positions the spool member 372 to the shut-off position. When the control lever is moved in the reverse direction, pressure from line 380 enters line 378 to similarly actuate the cam in the opposite or R direction.

The shape of the pump and motor cam slots is selected to provide relative swash plate positions as shown in FIG. 5. Therefore, as the control lever is moved, the swash plates are positioned in infinitely small steps to provide continuously variable operation in forward and reverse.

To provide high range, the range lever is moved to the H or high position. This allows pressure to enter line 442 and move portion 134 to the left to engage the high range clutch. The pressure in lines 444 and 446 is simultaneously drained. This allows the spring in the compensator actuator to reposition the piston firmly against the right side as shown.

In high range, the control lever functions in the same manner. As the lever is moved toward forward, the pump displacement and output speed is further increased. As the lever is moved toward reverse, the output speed is decreased. Therefore, the control lever also provides variable operation in high range.

Referring to the operation of the compensating means 390, in low range the piston is forced to the left against the compressed spring. In order to understand operation, if in low range, it were desired to operate at a ratio of .5 both the pump and motor would be at approximately full displacement as shown in FIG. 5. If, at this point, the range lever were shifted to H or high range with the pump and motor at full angle, the ratio would suddenly change to 1.0 as also shown in FIG. 5.

The function of the compensator means is to maintain a constant ratio when shifting range. Referring to the above operation in low range, both the pump and motor swash plates are at full angle. As the range lever is moved to high range, the pressure on the right side of the compensator actuator piston is released. Since the control lever position is maintained by the friction disc 404, the spring acts on the piston of the compensator actuator and moves the rod 388 to reposition the cam toward the reverse direction. This reduces the pump and motor ratio the same amount that the high range clutch increases the mechanical ratio. In the above operation in high range, the pump angle is reduced to 0, thereby maintaining the over-all ratio of .5 after shifting.

It is, therefore, apparent that the compensator actuator functions to adjust the pump-motor ratio in a direction opposite to the ratio change effected by the high range clutch or low range brake in such a manner as to maintain constant over-all ratio.

The compensator characteristic is desirable as it provides a smooth transition when shifting ranges, and since there is no change of output speed there are no torque surges on the friction discs of the high range clutch or the low range brake which increases the life of the components.

To provide neutral or 0 output torque, the range lever is positioned to N. This drains the pressure in both lines 442 and 444 thereby releasing pressure in the force piston disengaging both the high range clutch and the low range brake. With both the clutch and brake released both the hydraulic and mechanical driving connections to the planetary gear train are open. It will also be noted that when the spool member 422 is in a neutral position, line 444 will be vented from the right hand end portion of the bore within the valve body 424, this vent means also being indicated by the reference character D.

Referring now particularly to FIGS. 8 and 9 of the drawings, a further modification is illustrated which is particularly designed to effect synchronous shifting of the clutch and brake elements when changing ranges. This modification also includes a power take-off means.

A casing 500 is provided, and an input shaft 502 extends through a suitable opening provided in the casing and is rotatably journalled by a first set of ball bearings 504 supported by the casing, the opposite end of the input shaft being rotatably supported by bearings 506 supported in a common valve plate structure 508 which is fixed to the casing 500.

A charge pump is indicated generally by reference numeral 510 and includes an inner rotor 512 fixed to the input shaft 502 and an outer rotor 514 which rotates in the casing, the two rotors being eccentrically mounted with respect to one another and including teeth which are in intermeshing engagement with one another for pumping liquid to a port in a manner similar to the charge pump arrangement previously described.

The hydraulic transmission of this form of the invention includes a pair of hydraulic elements indicated generally by reference characters 520 and 522 which may be considered a pump and a motor respectively. Pump 520 includes a drum 526 disposed in surrounding relationship to the input shaft 502 and keyed thereto for rotation therewith. A plurality of pistons 528 are reciprocably mounted within bores 530 provided in drum 526. Suitable ports 532 are provided in communication with the cylindrical bores provided in the drum, ports 532 cooperating with timing ports and drilled passages indicated by reference numeral 534 which are provided in the valve plate structure to provide hydraulic flow between the pump and motor units.

The motor unit 522 includes a drum 540 having a plurality of pistons 542 reciprocably mounted within bores 544 provided therein. Ports 546 are in communication with the bores 544 and also provide communication with the ports and passages 534 provided in the valve plate structure. It will be understood that the two drums 526 and 540 form a running seal with the opposite sides of the valve plate structure.

Drum 540 is disposed in surrounding relationship to an intermediate shaft 550 and is splined thereto for rotation therewith. Shaft 40 is rotatably supported by a set of bearings 552 mounted within the valve plate structure 508 and by a ball bearing means 554 supported by the casing.

The pistons 528 reciprocably mounted within drum 526 are adapted to react on the swash plate thrust bearing 558 which is supported by a bearing housing 560 which is in turn further supported by a trunnion means 562 pivotally supported by the transmission casing. An arm 564 extends away from the trunnion means 562 and includes a laterally extending pin means 566 adapted to cooperate with suitable cam plate means of a control system similar to that previously described.

The pistons 542 reciprocably mounted within drum 540 are adapted to react on a swash plate thrust bearing 570 which is supported by a bearing housing 572 which is secured to trunnion means 574 pivotally supported by the transmission casing. An arm 576 extends from the trunnion means and a laterally extending pin means 578 is secured to the outer end of the arm and is adapted to engage a cam plate means similar to that previously described.

A further intermediate shaft 580 extends within hollow shaft 550 and is splined thereto for rotation therewith. A sun gear 582 is formed integral with shaft 580, and a second sun gear means 584 is splined to shaft 580, these sun gear means forming members of a compound planetary gear system hereinafter fully described.

The compound planetary gear system may be most clearly understood when considering FIGS. 8 and 9 in conjunction with one another, and sun gear 582 meshes with planet gears 590 which in turn mesh with ring gear 592. Planet gears 590 are rotatably journalled on shafts 594 which are supported by carrier means 595. Carrier means 595 is formed integrally with a gear 596 rotatably journalled by bearings 598 on the outer surface of intermediate shaft 580.

Ring gear 592 is formed integral with a carrier portion 601 which in turn is integrally connected with an output shaft 602 extending outwardly of the casing. Output shaft 602 is rotatably journalled in the casing by ball bearing means 604, and bearings 606 serve to support the end portion of intermediate shaft 580 within a recessed portion of the output shaft. Further bearing means 607 is provided for rotatably supporting shaft 580 within carrier means 601.

Sun gear means 584 meshes with planet gears 608 which are rotatably journalled on shafts 600 which are supported by carrier means 601, and these planet gears in turn mesh with ring gear 610.

Brake means is operatively associated with ring gear 610 and includes a first plurality of brake discs 614 which are fixed for rotation with the ring gear 610. A second plurality of brake discs 616 are interconnected with a member 618 so as to be fixed against rotation with respect to the casing, discs 616 being disposed between alternate ones of discs 614.

A power piston 620 is movably supported within the hollow interior of member 618 and is sealed with respect thereto for receiving fluid pressure for actuating the piston. A compression spring 622 normally urges piston 620 to the right as seen in FIG. 8 so as to release the brake. Fluid pressure is adapted to overcome the force of this spring to urge the piston 620 to the left to cause engagement of the multiple disc brake means for holding the ring gears 610 against rotation.

A gear 626 is formed integral with the input shaft 502, gear 626 meshing with a gear 628 formed integral with an auxiliary shaft 630 which includes an enlarged hollow portion 632. The auxiliary shaft 630 and enlarged portion 632 are rotatably supported upon a power take-off shaft 634 by spaced bearing portions 636 and 638. The power take-off shaft is in turn rotatably supported within ball bearings 644 and 646 at opposite ends of the casing, and an end portion 648 extends outwardly of the casing to provide a conventional power take-off means.

A power take-off clutch is provided, an a member 650 is splined to the outer surface of power take-off shaft 634 and has a plurality of clutch discs 652 supported for rotation therewith. A plurality of clutch discs 654 are interposed between the clutch discs 652 and are mounted for rotation with the enlarged portion 632 of the auxiliary shaft. A power piston 656 is provided for engaging the power take-off clutch, and this power piston operates to one side of a dividing wall 658 extending radially inwardly from portion 632. It is apparent that upon application of fluid pressure behind the power piston, this piston which is sealed with respect to portion 632 will move to the left to engage the power take-off clutch.

A hollow shaft portion 660 has a gear 662 splined to the outer end portion thereof, gear 662 being in mesh with the gear 596 formed integrally on carrier portion 594 of the compound planetary gearing. Shaft portion 660 is rotatably supported by ball bearing means 663 and a bearing 664. A plurality of clutch discs 666 are supported on the outer surface of shaft portion 660 and mounted for rotation therewith, a second plurality of clutch discs 668 being fixed for rotation with the enlarged portion 632, clutch discs 666 and 668 being interposed between one another. A power piston 670 is adapted to actuate the high range clutch upon the application of fluid pressure behind the power piston as will be well understood.

Each of the power pistons 656 and 670 may be normally retained in their retracted position by a conventional compression spring means (not shown).

The operation of the modification shown in FIGS. 8 and 9 may be most clearly understood by reference to the graphs appearing in FIGS. 12, 13 and 14 which illustrate various operating characteristics of the transmission as the function of the output/input speed.

For explanation purposes, it is assumed that the input shaft is constantly turning at 2000 r.p.m. and the auxiliary shaft 630 is so geared to the input shaft that it is driven at a speed of approximately 540 r.p.m. which corresponds to the normal power take-off drive speed as employed in tractors and the like. It should be understood that the power take-off clutch does not function as part of the transmission insofar as transmitting drive to the output shaft is concerned, and the reason for including this clutch will appear hereinafter.

In low range operation, the low range brake is applied which locks ring gear 610 against rotation, and the high range clutch is disengaged. The input shaft 502 drives the pump, and as the pump displacement is increased from 0, it displaces fluid into the motor and drives the motor in the same direction as the input shaft.

The motor drives sun gear means 584 which drives the planet gears 608. Planet gears 608 react against the locked ring gears 610 to drive the carrier means 601 and out shaft 602 at approximately a 3.3:1 reduction, which multiplies the motor torque accordingly. As the pump displacement is increased, it drives the motor faster and the output speed increases.

When the pump is at full displacement and it is desired to increase the output speed further, the motor displacement is decreased which allows the pump to overdrive the motor and increase the output speed further.

To effect reverse operation, the pump swash plate is positioned overcenter to a negative angle. This reverses the fluid flow into the motor which drives the output shaft in the reverse direction. Since the pump is completely variable, it is apparent that continuous positive drive is provided from forward to reverse without any discontinuity of driving torque to the output shaft. In low range operation, it is apparent that all the power flow is through the pump and motor circuit.

Considering the operation of the planetary gear train, in low range, the sun gear 582 drives planet gears 590. Ring gear 592 which is connected to the output shaft is driven at approximately a 3.3:1 reduction with respect to shaft 580 and sun gear 582. The reaction of sun gear 582 and the ring gear 592 on planet gears 590 is to drive the carrier means 595 at a speed less than shaft 580, but more than ring gear 592, and in the same direction of rotation.

Sun gear 582, planet gears 590 and ring gear 592 are dimensioned so that at a .44 ratio the carrier means 595 and gear 596 drive gear 662 and the shaft portion 660 at 540 r.p.m. in an opposite direction to that of the input shaft. It was previously noted that gears 626 and 628 cooperate to drive auxiliary shaft 630 and portion 632 at 540 r.p.m. also, in a direction opposite to the direction of rotation of the input shaft.

At a .44 ratio, in anticipation of higher output speed operation, the high range clutch is applied and the low range brake is disengaged. During this transition from low range to high range, there is no difference in speed between shaft portions 660 and 630, and accordingly this change is made without any change in over-all ratio and without change in speed or direction of any of the components. This affords very smooth and continuous operation and substantially reduces any wear and loading on the elements of the clutch and the entire power train.

It also follows in when shifting from high range into low range, ring gear 610 is stationary at .44 ratio which provides synchronous engaging of the brake elements and which eliminates any change of speed or direction of the components thereof.

At the point of transition from low to high range, the swash plates of the pump and motor remain in the same relative displacement. The power flow is now from the input shaft through the auxiliary shaft 630 and from the planetary gearing to the output shaft. At this stage of operation, some of the power is also regenerated back through the hydraulic motor and to the pump which redirects this power to the auxiliary shaft. This is apparent by the increase in operating pressure immediately following the transition point as indicated on FIG. 13.

In high range, as the pump displacement is decreased, the speed of rotation of sun gear 582 is reduced and the planet carrier means 595 drives ring gear 592 and output shaft 602 at a higher speed.

When the pump displacement is 0 which corresponds to a .82 ratio, all the power is transmitted by the mechanical elements through the auxiliary shaft 630 and through the planetary gear train to the output shaft. At this point, there is no hydraulic flow and accordingly no hydraulic power path.

To operate above .82 ratio, the pump swash plate is displaced overcenter to a negative angle. This again drives the motor in a reverse direction. The reverse rotation of the sun gears 582 drives the planet gears 590 in a direction to further increase the speed of the ring gear 592 and the output shaft. Above .82 ratio, the power transmitted is split, a part of the power flowing through the auxiliary shaft 630 to the output planetary gearing, and the remaining power being directed from the pump to the motor and thence to the output planetary gear train.

To provide maximum output speed, the motor displacement is reduced. This allows the pump to overdrive the motor, which drives sun gear 582 at a maximum speed in a reverse direction to effect maximum output speed.

As is well understood in the application of transmissions to tractors and the like, it is necessary to provide a power take-off for powering implements and other accessory equipment. This power take-off is normally located near the draw-bar at the rear of the tractor, and most generally is geared to provide an operating speed of approximately 540 r.p.m. This modification provides an auxiliary shaft speed of approximately 540 r.p.m. which allows the provision of a direct power take-off drive from shaft 634 without requiring any additional gearing or other auxiliary drive connections.

Referring now particularly to FIGS. 10 and 11 of the drawings, a further modified form of the invention is illustrated which also provides synchronous shifting of the clutch and brake elements, and in this modification a casing 680 is provided, an input shaft 682 extending into the casing through a suitable opening and being rotatably supported by a ball bearing 684 mounted within the casing and bearing means 686 disposed within a common valve plate structure 688. This valve plate structure is provided with suitable timing ports and passages as indicated by reference numerals 690 for providing proper hydraulic communication between a pair of hydraulic elements.

The hydraulic portion of this transmission includes a pump indicated generally by reference numeral 694 and a motor indicated generally by reference numeral 696. The pump includes a drum 700 which is disposed in surrounding relation to and is keyed to the input shaft 682 for rotation therewith. Drum 700 has a running seal with a left hand side of the common valve plate structure 688.

A plurality of pistons 702 are reciprocably mounted within bores 704 provided in drum 700, port 706 providing communication between bores 704 and the ports and passages provided in the common valve plate structure. The swash plate means includes a swash plate thrust bearing 710 which is supported by a bearing housing 712, this bearing housing in turn being supported by suitable trunnion means which is operatively connected with a cam plate control means in a manner similar to that previously described.

The motor 696 includes a drum 720 which is disposed in surrounding relationship and is keyed for rotation with an intermediate shaft 722 which is rotatably journalled within a ball bearing means 724 mounted in the casing and bearing means 726 mounted in the common valve plate structure.

A plurality of pistons 730 are reciprocably mounted within bores 732 provided in drum 720, and ports 734 provide communication between these bores and the ports and passages provided in the valve plate structure.

Swash plate means for controlling the operation of the pistons of the motor includes a swash plate thrust bearing 736 which is supported by a bearing housing 738 which in turn is mounted upon suitable trunnions and which can be operatively connected with a control cam plate means in the aforedescribed manner.

A further intermediate shaft 740 is splined to the interior of hollow shaft 722, a sun gear 742 being formed integrally on the outer portion of shaft 740. The construction of the compound planetary gearing may best be understood from a consideration of FIGS. 10 and 11 in conjunction with one another.

Planet gears 744 mesh with sun gear 742, the planet gears being rotatably journalled on shafts 746 which are supported by a carrier means 747 which in turn is formed integral with the output shaft 748. Planet gears 744 also mesh with a ring gear 750.

Planet gears 744 are further in mesh with the elongated planet gears 754 rotatably journalled on shafts 749 which are also supported by carrier 747, the planet gears 754 further meshing with a ring gear 756. It will be noted that the right hand end portion of intermediate shaft 740 is rotatably supported within bearing means 760 mounted within the end of output shaft 748. Carrier means 747 is rotatably supported by bearing means 762 disposed about shaft portion 740, and ring gear 756 is rotatably supported by bearing means 764 which is also mounted about intermediate shaft portion 740. Ring gear 750 is rotatably supported by means of bearing means 766 which is mounted about the inner end of the output shaft.

An auxiliary shaft 770 is splined to the inner portion of hollow input shaft 682, the opposite end of auxiliary shaft 770 being supported by bearing means 772 within a member 774 which is fixed to the casing.

A member 780 is splined to the outer surface of shaft 770, and a plurality of clutch discs 782 are fixed for rotation with member 780. A further plurality of clutch discs 784 are interposed between discs 782 and are fixed for rotation with a hollow member 786 which is in turn supported by bearing means 788 on the outer surface of shaft 770. Member 786 is provided with a gear portion 790 on the outer surface thereof which is in mesh with a gear portion 792 formed on the outer surface of the ring gear 756 previously described.

A power piston 796 is provided within hollow member 786 and is sealed with respect thereto such that upon application of fluid pressure to the left hand side of the power piston as seen in FIG. 10, the power piston will move to the right and engage the high range clutch including the multiple disc clutch elements 782 and 784. Suitable compression spring means (not shown) may be provided for normally returning the power piston to its release position so as to disengage the clutch.

A low range brake includes a first plurality of disc brake elements 800 which are fixed against rotation and connected with the fixed member 774 previously described. A second plurality of brake discs 802 are interposed between brake discs 800 and are fixed for rotation with a hollow member 804 which is rotatably supported by bearing means 806 disposed in surrounding relationship to shaft 770.

Hollow member 804 is provided with a gear portion 808 formed on the outer surface thereof which is in mesh with a gear portion 810 formed on the outer surface of ring gear 750 previously described.

A power piston 812 is mounted within hollow member 804 and is sealed with respect thereto, power piston 812 being adapted to move to the right as seen in the drawings to engage the low range brake elements when fluid pressure is applied to the left of the piston. Suitable spring means (not shown) may be provided for normally moving the piston 812 to the left into its release position.

The general operation of the modification illustrated in FIGS. 10 and 11 is the same as that of the modification shown in FIGS. 8 and 9. Since the arrangement of the hydraulic elements, the clutch and brake means and the output planetary gearing are different, the direction of rotation of various components may be different from that shown in FIGS. 12, 13 and 14, but, however, the magnitude of the various speeds and other variables are the same.

In low range, the low range brake is applied and the high range clutch is disengaged. The low range brake locks the ring gear 750.

The input shaft drives the pump, and as the pump displacement is increased, it displaces fluid to drive the motor in the opposite direction of rotation as the input. The motor drives shafts 722 and 740 and sun gear 742. Sun gear 742 in turn drives planet gears 744 which react against the locked ring gear 750 to drive the carrier means 747 and the output shaft at approximately 3.3:1 reduction, which multiplies the motor torque.

As the pump displacement is increased, it drives the motor and output shaft at a higher speed. At full pump displacement, if it is desired to further increase the output speed, the motor displacement is reduced, which allows the pump to overdrive the motor and further increases the output speed.

When the pump swash plate is positioned overcenter to a negative angle, the hydraulic flow to the motor is reversed thereby driving the motor in an opposite direction to provide reverse operation. Since the pump displacement is variable, continuous drive is provided from forward to reverse and vice versa.

Referring now to the operation of the compound planetary gear train, in low range forward, the motor drives the sun gear 742 in a direction opposite to the input shaft. Sun gear 742 drives planet gears 744 and the planet carrier 747 in the same direction as the sun gear. Planet gears 744 also drive the planet gears 754 which in turn drives ring gear 756 in the same direction as sun gears 742 at a speed less than that of sun gears 742 but at a speed higher than that of the planet carrier means 747. Accordingly, it is understood that sun gear 742, carrier means 747 and ring gear 756 are all turning in the same direction which is opposite to the direction of rotation of the input shaft 682 and the auxiliary shaft 770. Accordingly, the interengagement between the gear portion 792 on the outer side of ring gear 756 with the gear portion 790 on hollow member 786 causes the member 786 to be driven in the same direction of rotation as shaft 770.

Planet gears 754, ring gear 756 and the interengaging gear portions 790 and 792 drive member 786 at such a speed that at approximately 2800 r.p.m. motor speed which corresponds to a ratio of .44, member 786 rotates at approximately 2000 r.p.m. in the same direction as shaft 770 is turning at 2000 r.p.m.

At this ratio, in anticipation of higher speed operation, the high range clutch is engaged and the low range brake is released. Since the friction discs attached to members 786 and 780 are rotating at the same speed, this transition into high range is made without any variation in over-all ratio and without any change in speed or direction of any components. This snychronous shifting affords very smooth and continuous functioning and substantially reduces wear of the disc elements and loading on the entire power train.

It is apparent that when shifting from high to low at .44 ratio, ring gear 750 is stationary and the low range brake is applied when there is substantially no relative rotation of the friction discs of the brake.

At the point of transition from low to high range, the swash plates of the pump and motor remain in the same relative displacement. The input shaft drives the planetary gear train through the high range clutch. At this stage of operation, some of the power is regenerated back through the hydraulic motor into the pump and redirected back through the planetary gearing to the output shaft.

In high range, as the pump displacement is decreased, the speed of rotation of the motor and sun gears 742 is reduced, and the ring gear 756 drives the planet carrier and output shaft at a higher speed.

As the pump swash plate is controlled to 0, corresponding to a .82 ratio, all the power is transmitted by the high range clutch through the planetary gear train to the output shaft. At this ratio, there is no hydraulic flow or power.

To operate above .82 ratio, the pump swash plate is controlled to a negative angle. This drives the motor and sun gear 742 in a direction opposite to the output rotation. The opposite rotation of sun gear 742 drives planet gears 744 and 754 in a direction to further increase the speed of the carrier means 747 and the output shaft.

Above .82 ratio, the power is split, part of the power passing through the high range clutch, and part of the power passing through the hydraulic pump-motor circuit.

To provide maximum output speed, the motor displacement is reduced which allows the pump to over-drive the motor and sun gear 742 at a maximum speed to effect highest output speed.

The control system illustrated in FIG. 4 is also generally adaptable to the modifications shown in FIGS. 8 through 10. Since the motor-pump displacement relationship is different than the previously described modifications, it is understood that the cam plate means 350 as seen in FIG. 4 will be changed to correspond to the pump motor swash plate relationship illustrated in FIG. 12 of the drawings as applying to the modification shown in FIGS. 8–11. Also, since the synchronizing feature of the modification shown in FIGS. 8–11 eliminates the change in over-all ratio during transition from one range to another, the compensator means 390 is not required and accordingly lever 384 would be directly linked to lever portion 398 as seen in FIG. 4 when employing the control system with the last two described modifications.

If it were desired to shift from one range to another at .44 ratio without the necessity of positioning the range lever 432 of FIG. 4, it is understood that the range spool valve 422 could be appropriately linked to the actuator members 350, 360 and 362 so as to shift range automatically when these members pass through .44 ratio.

It will of course be understood that the modification shown in FIGS. 8–11 also provide extended range operation in the same manner as the other modifications with the same general advantages and additionally provides synchronous shifting of the clutch and brake elements.

It is apparent from the foregoing that there is provided according to the present invention an extended range hydraulic transmission which provides continuously variable operation over a wide range including reverse. A hydraulic pump-motor circuit is provided in combination with a mechanical power circuit which extends the operating range and at the same time reduces the size of the hydraulic elements thereby increasing efficiency, reducing noise and decreasing the over-all size of the transmission. Each of the transmissions of the present invention employs a common valve plate structure in combination with pump and motor units wherein the drums are mounted for rotation about fixed axes of rotation. This enables the various components of the transmission to be arranged in a very simple, compact and inexpensive construction. This naturally results in a reduction in cost of the transmission also. The construction of each of the transmissions illustrated in FIGS. 1 through 3 and 8 and 10 is very flexible, allowing substantial variations in the type and arrangement of the mechanical elements without sacrificing compactness or simplicity of design. Multiple disc type clutch and brakes are employed which permit power shifting of the transmission in certain modifications to thereby eliminate the necessity of providing any synchronizing mechanism. Additionally, a novel control system is provided which provides continuously variable operation and extended range of operation and includes a compensating means that enables the drive ratios through the different power paths of the transmission to be changed while maintaining a substantially constant output speed and torque output.

Further modifications of the invention provide an arrangement wherein an extended range hydraulic transmission is provided with selectively engageable and disengageable clutch and brake means which function when the associated members are substantially in synchronization, thereby reducing wear and loading on all the components. These modifications do not change instantaneous drive ratios during shifting from one range to another, thereby providing smooth continuous operation and eliminate the necessity of providing the compensating features in the control system. One of these last-mentioned modifications also provides an auxiliary power take-off shaft without the necessity of adding additional gearing and other separate drive components.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim.

1. An extended range hydraulic transmission comprising input means, hydraulic transmission means including a pair of separate hydraulic elements, means providing hydraulic communication between said elements, one of said hydraulic elements being permanently drivingly connected with said input means, output planetary gearing including a plurality of members, the other of said hydraulic elements being permanently drivingly connected with one of the members of said output planetary gearing, output means, another member of said output planetary gearing being permanently drivingly connected with said output means, means providing a driving connection between said input means and a third member of said output planetary gearing, said last-mentioned driving connection including selectively engageable and disengageable means for connecting or disconnecting said third member from said input means, fixed means, selectively engageable means for connecting or disconnecting said third member with said fixed means for holding said third member against movement, said hydraulic elements each including drum means having a plurality of pistons reciprocably mounted therewithin, swash plate means for controlling the stroke of said pistons, and a control system operatively connected with each of said selectively engageable and disengageable means for operating said selectively engageable and disengageable means, said control system also being operatively connected with said swash plate means for controlling the movement thereof, said control system including compensating means which operates the swash plate means to adjust the drive ratio through said hydraulic elements in a direction opposite to the drive ratio change effected by said selectively engageable and disengageable means in such a manner as to maintain a constant over-all drive ratio.

2. An extended range hydraulic transmission comprising an input shaft, a hydraulic transmission comprising a pair of hydraulic elements defining a pump and motor arrangement, each of said hydraulic elements being associated with a common hydraulic valve plate structure providing hydraulic intercommunication therebetween for acting as a pump and motor arrangement, each of said hydraulic elements including a drum means having said piston means reciprocably mounted therewithin, each of said drum means being mounted for rotation about a fixed axis of rotation, one of said hydraulic elements being permanently drivingly interconnected with said input shaft, output planetary gearing comprising a plurality of drivingly connected members, another of said hydraulic elements being drivingly connected with one member of said output planetary gearing, an output shaft, said output shaft being drivingly connected with another member of said output planetary gearing, means providing a driving connection between said input shaft and a third member of said output planetary gearing, said last-mentioned driving connection including a selectively operable clutch means for engaging or disengaging the said third member with respect to said input shaft, fixed means, a selectively engageable and disengageable brake means for connecting or disconnecting said third member of the output planetary gearing with said fixed means, each of said hydraulic elements including swash plate means for controlling the reciprocation of the piston means thereof, and a control system operatively connected with said swash plate means and with said clutch and brake means for moving the swash plate means and adjusting the angle thereof and for engaging and disengaging the clutch and brake means to provide an extended range of operation, said control system including compensator means which functions to adjust the pump and motor ratio in a direction opposite to the ratio change effected by the clutch or brake means in such a manner as to maintain a constant over-all drive ratio to thereby provide a smooth transition when shifting ranges and to maintain a substantially constant speed and torque output.

3. Apparatus as defined in claim 2 including first control means for controlling the angle of said swash plate means to thereby control the pump and motor ratio, second control means for controlling the engagement and disengagement of said clutch means and said brake means to thereby control the mechanical driving ratio, said compensator means being mechanically interconnected with said first control means, and a hydraulic connection between said compensator means and said second control means for controlling the operation of said compensator means in accordance with shifting movements of said second control means.

4. Apparatus as defined in claim 3 wherein said compensator means includes a cylinder element and a piston element, one of said elements being drivingly connected with the means for controlling movement of said swash plates, and the other of said elements being operatively connected with said first control means, spring means within said cylinder element normally urging said piston element in one direction, said hydraulic connection being connected with said cylinder element so as to urge said piston in a direction contrary to the direction it is urged by said spring means.

5. An extended range hydraulic transmission comprising a casing, an input shaft extending into said casing, an output shaft extending outwardly of said casing, hydraulic transmission means within said casing including a pair of hydraulic elements, each of said elements including drum means, a plurality of pistons reciprocably disposed within each of said drum means, swash plate means associated with the pistons of each hydraulic element for controlling the stroke of the pistons, said hydraulic transmission means including a common hydraulic valve plate structure fixed to said casing and operatively associated with said drum means for providing hydraulic communication therebetween, said input shaft being rotatably journalled at one end thereof within said valve plate structure, one of said drum means being disposed in surrounding relationship to said input shaft and fixed thereto for rotation therewith, an intermediate shaft having one end thereof rotatably journalled within said valve plate structure, the other of said drum means being disposed in surrounding relationship to said intermediate shaft and being fixed for rotation therewith, said input shaft and said intermediate shaft being in alignment with one another, said drum means being disposed at opposite sides of said valve plate structure and in running contact therewith, a second intermediate shaft rotatably journalled within said casing and disposed in spaced parallel relationship with said input shaft and said first-mentioned intermediate shaft, sun gear means disposed at one end of said second intermediate shaft, planet gear means in engagement with said sun gear means and fixed to said output shaft, ring gear means disposed in engagement with said planet gear means, gear means fixed to said first-mentioned intermediate shaft in engagement with said ring gear means, a sleeve member disposed in surrounding relationship to said second intermediate shaft and mounted for rotation with respect thereto, said sleeve member being geared to said input shaft for rotation therewith, selectively engageable and disengageable clutch means for selectively engaging or disengaging said sleeve member to said second intermediate shaft, a fixed sleeve member disposed in surrounding spaced relationship to said second intermediate shaft, selectively engageable and disengageable brake means for connecting said second intermediate shaft to said fixed sleeve member for fixing said second intermediate shaft against rotation, and power operated means for selectively and alternatively operating said clutch and brake means.

6. Apparatus as defined in claim 5 including a control system operatively connected with the swash plates and the selectively operable clutch and brake means of the transmission for controlling the operation thereof, said control system including means for changing the drive ratio through said hydraulic transmission means and for changing the drive ratio through the mechanical drive means including the components associated with said second intermediate shaft, said control system including compensation means for changing the drive ratio through said hydraulic transmission means in a direction opposite to the change in drive ratio effected through said mechanical connection so as to maintain a constant over-all drive ratio whereby the transmission is enabled to make a smooth transition when shifting ranges with substantially no change in output speed or torque output.

7. An extended range hydraulic transmission comprising an input shaft, a hydraulic transmission comprising a pair of hydraulic elements, each of said hydraulic elements including drum means having a plurality of pistons reciprocably mounted therewithin, swash plate means associated with each of said hydraulic elements for controlling the movement of said pistons, said hydraulic transmission means including a common hydraulic valve plate structure, each of said drum means being disposed at one side of said valve plate structure, said valve plate structure providing hydraulic communication between said hydraulic elements, one of said drum means being disposed in surrounding relationship to said input shaft and secured thereto for rotation therewith, an intermediate shaft means, the other of said drum means being disposed in surrounding relationship to said intermediate shaft means and secured thereto for rotation therewith, an output shaft, output planetary gearing including a plurality of members, one of said members being permanently drivingly connected with said output shaft, another of said members being permanently drivingly connected with said intermediate shaft means, means providing a driving connection between said input shaft and a third member of said output planetary gearing, said last-mentioned driving connection including selectively operable clutch means, fixed means, and selectively operable brake means for connecting said third member of the output planetary gearing with said fixed means, said clutch and brake means being disposed at the opposite side of said valve plate structure from said drum means.

8. Apparatus as defined in claim 7 wherein said third member of the output planetary gearing is disposed at one end of a second intermediate shaft means, an intermediate drive member secured for rotation with said second intermediate shaft means, said clutch means being adapted to connect said intermediate drive member with said input shaft, and a second intermediate member disposed in driving engagement with said first-mentioned intermediate member, said second intermediate member being rotatably journalled on said first-mentioned intermediate shaft means, said brake means being adapted to connect said second intermediate member with said fixed means, said first-mentioned intermediate shaft means being rotatably supported within said valve plate structure.

9. Apparatus as defined in claim 8 including a control system operatively connected with the swash plates and the selectively operable clutch and brake means of the transmission for controlling the operation thereof, said control system including means for changing the drive ratio through said hydraulic transmission means and for changing the drive ratio through the mechanical drive means including the components associated with said second intermediate shaft, said control system including compensation means for changing the drive ratio through said hydraulic transmission means in a direction opposite to the change in drive ratio effected through said mechanical connection so as to maintain a constant over-all drive ratio whereby the transmission is enabled to make a smooth transition when shifting ranges with substantially no change in output speed or torque output.

10. An extended range hydraulic transmission comprising an input shaft, hydraulic transmission means comprising a pair of hydraulic elements, each of said hydraulic elements including drum means, a plurality of pistons reciprocably mounted within each of said drum means, swash plates operatively associated with the pistons in each drum means for controlling the movement of said pistons, a common hydraulic valve plate structure interposed between said hydraulic elements, the drum means of said hydraulic elements having a running fit with opposite sides of said valve plate structure, said valve plate structure providing hydraulic communication between said hydraulic elements, one of said drum means being disposed in surrounding relationship to and fixed to said input shaft for rotation therewith, a first intermediate shaft having sun gear means formed at one end thereof, the opposite end thereof being fixed to the other of said drum means for rotation therewith, a second intermediate shaft, planet gear means drivingly engaged with said sun gear means, a selectively engageable and disengageable clutch means for selectively connecting said second intermediate shaft with said planet gear means, ring gear means, an output means, said output means being operatively connected with said ring gear means, fixed means, and a selectively operable brake means for selectively connecting and disconnecting said planet gear means with said fixed means for holding said planet gear means when said brake means is engaged.

11. An extended range hydraulic transmission comprising a casing, an input shaft extending into said casing, hydraulic transmission means comprising a pair of hydraulic elements each of which includes drum means, a plurality of pistons reciprocably mounted within each of said drum means, swash plates operatively associated with the pistons of each drum means for controlling the movement of said pistons, a common hydraulic valve plate structure fixed to said casing and interposed between said drum means, said drum means engaging opposite faces of said valve plate structure, said input shaft being rotatably journalled within said valve plate structure, one of said drum means being disposed in surrounding relationship to and operatively connected with said input shaft for rotation therewith, a first intermediate shaft having one end thereof rotatably journalled within said valve plate structure, the other of said drum means being disposed in surrounding relationship to said first intermediate shaft and operatively connected thereto for rotation therewith, said first intermediate shaft and said drive shaft being aligned with one another, said drum means each being mounted for rotation about a fixed axis which is coincidental with the axis of rotation of said input shaft and said first intermediate shaft, said first intermediate shaft having sun gear means formed at the end thereof, a second intermediate shaft connected with said input shaft for rotation therewith and being disposed within said first intermediate shaft and concentric therewith, planet gear means operatively connected with said sun gear means, a selectively engageable and disengageable clutch for connecting or disconnecting said second intermediate shaft with said planet gear means, ring gear means operatively connected with said planet gear means, output means operatively connected with said ring gear means, fixed means, and a selectively engageable and disengageable brake for connecting said planet gear means with said fixed means.

12. Apparatus as defined in claim 11 including a control system operatively connected with the swash plates and the selectively operable clutch and brake means of the transmission for controlling the operation thereof, said control system including means for changing the drive ratio through said hydraulic transmission means and for changing the drive ratio through the mechanical drive means including the components associated with said second intermediate shaft, said control system including compensation means for changing the drive ratio through said hydraulic transmission means in a direction opposite to the change in drive ratio effected through said mechanical connection so as to maintain a constant over-all drive ratio whereby the transmission is enabled to make a smooth transition when shifting ranges with substantially no change in output speed or torque output.

13. An extended range hydraulic transmission comprising input means, hydraulic transmission means including a pair of separate hydraulic elements, means providing hydraulic communication between said elements, one of said hydraulic elements being drivingly connected with said input means, output planetary gearing including a plurality of members, the other of said hydraulic elements being drivingly connected with one of the members of said output planetary gearing, output means, another member of said output planetary gearing being drivingly connected with said output means, means providing a driving connection between said input means and a third member of said output planetary gearing, said last-mentioned driving connection including selectively engageable and disengageable means for connecting or disconnecting said third member from said input means, fixed means, and selectively engageable and disengageable means for operatively connecting a fourth member of said planetary gearing with said fixed means for holding said fourth member against movement.

14. Apparatus as defined in claim 13 including power take-off means, and selectively engageable and disengageable means for connecting or disconnecting said power take-off means with said driving connection between said input means and said third member of the output planetary gearing.

15. An extended range hydraulic transmission comprising an input shaft, an output shaft, hydraulic transmission means including a pair of separate hydraulic elements, means providing hydraulic communication between said elements, one of said hydraulic elements being drivingly connected with and in concentric relation to said input shaft, output planetary gearing including a plurality of members, one of said members of said output planetary gearing being drivingly connected with another of said hydraulic elements, said output shaft being drivingly connected with another of said members of the output planetary gearing, an auxiliary shaft, means drivingly connecting said auxiliary shaft with said input shaft, selectively engageable and disengageable means for drivingly connecting said auxiliary shaft to a third member of said output planetary gearing, fixed means, and selectively engageable and disengageable means for operatively connecting a fourth member of said planetary gearing with said fixed means for holding said fourth member against movement.

16. Apparatus as defined in claim 15 including a power take-off shaft disposed in substantial alignment with said auxiliary shaft and in spaced parallel relationship to said input shaft, and selectively engageable and disengageable means for drivingly connecting said power take-off shaft with said auxiliary shaft.

17. An extended range hydraulic transmission comprising an input shaft, an intermediate shaft substantially aligned with said input shaft, an output shaft substantially aligned with said intermediate shaft, hydraulic transmission means including a pair of separate hydraulic elements, means providing hydraulic communication between said elements, one of said hydraulic elements being drivingly connected with said input shaft, another of said hydraulic elements being drivingly connected with said intermediate shaft, output planetary gearing comprising a plurality of members, one of said members of the output planetary gearing being drivingly connected with said intermediate shaft, said output shaft being drivingly connected with another of said members of said output planetary gearing, an auxiliary shaft disposed in spaced parallel relation to said input shaft, intermediate shaft and output shafts, means drivingly connecting said auxiliary shaft with said input shaft, selectively engageable and disengageable means for operatively connecting said auxiliary shaft to a third member of said output planetary gearing, fixed means, a selectively engageable and disengageable means for operatively connecting a fourth member of the output planetary gearing to said fixed means for holding said last-mentioned member of the output planetary gearing against movement.

18. Apparatus as defined in claim 17 including a power take-off shaft disposed in substantial alignment with said auxiliary shaft and in spaced parallel relationship to said input shaft, intermediate shaft and output shaft, and selectively engageable and disengageable means for drivingly connecting said power take-off shaft with said auxiliary shaft.

19. An extended range hydraulic transmission comprising an input shaft, an auxiliary shaft substantially in line with said input shaft, an intermediate shaft disposed in spaced parallel relation to said input shaft, an output shaft substantially aligned with said intermediate shaft, hydraulic transmission means including a pair of separate hydraulic elements, means providing hydraulic communication between said elements, one of said hydraulic elements being drivingly connected with said input shaft, another of said hydraulic elements being drivingly connected with said intermediate shaft, output planetary gearing comprising a plurality of members, one of said members of said output planetary gearing being drivingly connected with said intermediate shaft, said output shaft being drivingly connected with another of said members of the output planetary gearing, means drivingly connecting said auxiliary shaft with said input shaft, selectively engageable and disengageable means for operatively connecting said auxiliary shaft to a third member of said output planetary gearing, fixed means, a selectively engageable and disengageable means for operatively connecting an additional planetary gear element of the output planetary gearing to said fixed means for holding said last-mentioned element of the output planetary gearing against movement.

20. An extended range hydraulic transmission comprising an input shaft, an output shaft, hydraulic transmission means including a pair of separate hydraulic elements, means providing hydraulic communication between said elements, one of said hydraulic elements being drivingly connected with said input shaft, output planetary gearing comprising a plurality of members, said output planetary gearing including sun gear means drivingly connected with another of said hydraulic elements, said output planetary gearing including carrier means and planet gear means rotatably supported by said carrier means, said planet gear means being in meshing engagement with said sun gear means, said carrier means being drivingly connected with said output shaft, said output planetary gearing including first ring gear means, said first ring gear means being in meshing engagement with said planet gear means, fixed means, selectively engageable and disengageable means for operatively connecting said first ring gear means to said fixed means for holding said first ring gear means against rotation, an auxiliary shaft, means drivingly connecting said auxiliary shaft with said input shaft, said output planetary gearing including an additional planetary gear element, and selectively engageable and disengageable means for drivingly connecting said auxiliary shaft with said additional gear means.

21. Apparatus as defined in claim 20 wherein said additional gear means comprises second ring gear means and second planet gear means in meshing engagement with said second ring gear means.

22. Apparatus as defined in claim 21 wherein said second ring gear means is formed integral with said carrier means.

23. Apparatus as defined in claim 20 wherein said additional gearing includes second ring gear means, second planetary gear means carried by said carrier means, and said second ring gear means being in meshing engagement with said second carrier means.

24. An extended range hydraulic transmission comprising an input shaft, an intermediate shaft substantially aligned with said input shaft, an output shaft substantially aligned with said intermediate shaft, hydraulic transmission means including a pair of separate hydraulic elements, means providing hydraulic communication between said elements, one of said hydraulic elements being drivingly connected with said input shaft, output planetary gearing comprising a plurality of members, said output planetary gearing including a pair of sun gear means, each of said sun gear means being drivingly connected with said intermediate shaft which is in turn drivingly connected with another of said hydraulic elements, said output planetary gearing including first carrier means, said first carrier means being drivingly connected with said output shaft, planetary gear means rotatably supported by said first carrier means and being in meshing engagement with one of said sun gear means, first ring gear means in meshing engagement with said planetary gearing means, fixed means, selectively engageable and disengageable means for operatively connecting said first ring gear means with said fixed means for holding said first ring gear means against movement, second ring gear means formed integral with said first carrier means, second carrier means, second planet gear means in meshing engagement with said second ring gear means and also being in meshing engagement with another of said sun gear means, an auxiliary shaft disposed in spaced parallel relation to said input shaft, intermediate shaft and output shafts, means drivingly connecting said auxiliary shaft with said input shaft, and selectively engageable and disengageable means for operatively connecting said auxiliary shaft with said second carrier means.

References Cited by the Examiner

UNITED STATES PATENTS

| | | | |
|---|---|---|---|
| 2,054,802 | 9/1936 | Bronander | 74—675 |
| 2,599,814 | 6/1952 | Cull | 74—687 |
| 2,869,397 | 1/1959 | Weaving et al. | 74—687 |
| 2,874,591 | 2/1959 | Thoma | 74—720.5 |
| 2,931,250 | 4/1960 | Ebert | 74—687 |
| 2,964,977 | 12/1960 | Kopec | 74—687 X |
| 3,095,757 | 7/1963 | Thoma | 74—687 |
| 3,122,025 | 2/1964 | Mark et al. | 74—687 X |
| 3,127,792 | 4/1964 | Balbaschewski | 74—687 |
| 3,132,533 | 5/1964 | Baker | 74—687 |
| 3,132,534 | 5/1964 | Boehner | 74—687 |
| 3,203,276 | 8/1965 | Bullard | 74—687 |

FOREIGN PATENTS 1,216,287  4/1960  France.

DAVID J. WILLIAMOWSKY, *Primary Examiner.*

J. R. BENEFIEL, *Assistant Examiner.*